(12) United States Patent
Ahrens et al.

(10) Patent No.: US 10,730,578 B2
(45) Date of Patent: Aug. 4, 2020

(54) COLLAPSIBLE CYCLE

(71) Applicants: Georg A. Ahrens, Sunny Isles Beach, FL (US); Vladislav V. Schedrin, Plantation, FL (US)

(72) Inventors: Georg A. Ahrens, Sunny Isles Beach, FL (US); Vladislav V. Schedrin, Plantation, FL (US)

(*) Notice: Subject to any disclaimer, the term of this patent is extended or adjusted under 35 U.S.C. 154(b) by 109 days.

(21) Appl. No.: 15/886,552

(22) Filed: Feb. 1, 2018

(65) Prior Publication Data

US 2018/0346053 A1 Dec. 6, 2018

Related U.S. Application Data

(60) Provisional application No. 62/453,039, filed on Feb. 1, 2017.

(51) Int. Cl.
| | |
|---|---|
| B62K 15/00 | (2006.01) |
| B62K 5/06 | (2006.01) |
| B62K 3/00 | (2006.01) |
| B62J 1/00 | (2006.01) |
| B62K 21/02 | (2006.01) |

(52) U.S. Cl.
CPC ............... *B62K 15/006* (2013.01); *B62J 1/00* (2013.01); *B62K 3/005* (2013.01); *B62K 5/06* (2013.01); *B62K 15/008* (2013.01); *B62K 21/02* (2013.01); *B62K 2204/00* (2013.01)

(58) Field of Classification Search
CPC .... B62K 15/006; B62K 15/008; B62K 3/005; B62K 5/06; B62K 2204/00; B62K 21/02; B62J 1/00

USPC ........................................................ 280/279
See application file for complete search history.

(56) References Cited

U.S. PATENT DOCUMENTS

| | | |
|---|---|---|
| 4,497,502 A | 2/1985 | Forbes |
| 4,546,992 A | 10/1985 | Swartz |
| 4,786,070 A | 11/1988 | Adee |
| 5,568,935 A | 10/1996 | Mason |
| 6,581,492 B1 | 6/2003 | Chen |
| D485,514 S | 1/2004 | Berg |
| 6,742,797 B2 | 6/2004 | Lopez |
| 6,827,358 B2 * | 12/2004 | Beleski, Jr. ............ B62K 3/002 280/124.11 |
| 6,988,741 B2 | 1/2006 | Borochov |
| 8,210,555 B2 | 7/2012 | Belenkov |
| 8,292,315 B1 | 10/2012 | Pelkonen |
| 8,342,555 B2 | 1/2013 | Ball |

(Continued)

FOREIGN PATENT DOCUMENTS

| | | |
|---|---|---|
| EP | 1847450 A2 | 10/2007 |
| JP | 2006062526 | 3/2006 |

*Primary Examiner* — Jacob D Knutson
*Assistant Examiner* — Felicia L. Brittman
(74) *Attorney, Agent, or Firm* — Robert M. Schwartz; Alfred K. Dassler

(57) ABSTRACT

A cycle includes a fork and a first wheel is mounted to the fork. A steerer tube is connected to the fork. The steerer tube has a longitudinal axis. The cycle includes a pair of second wheels. A pair of downtubes is rotationally mounted to the steerer tube about the longitudinal axis. The pair of downtubes have a fixed inclination with respect to the longitudinal axis. Each one of the down tubes respectively connects one wheel of the pair of second wheels to the steerer tube for pivoting the pair of second wheels together and apart.

9 Claims, 22 Drawing Sheets

(56) References Cited

U.S. PATENT DOCUMENTS

| | | | |
|---|---|---|---|
| 8,702,114 B2 | 4/2014 | Hadzicki | |
| 2002/0050695 A1* | 5/2002 | Feng | B62K 3/002 |
| | | | 280/87.041 |
| 2002/0063406 A1* | 5/2002 | Feng | B62K 3/002 |
| | | | 280/87.041 |
| 2003/0230869 A1 | 12/2003 | Beresnitzky | |
| 2004/0026891 A1 | 2/2004 | Berkelmans | |
| 2005/0001399 A1* | 1/2005 | Yeo | B62K 3/002 |
| | | | 280/87.041 |
| 2005/0082778 A1* | 4/2005 | Chuang | B62K 3/002 |
| | | | 280/87.041 |
| 2009/0184488 A1 | 7/2009 | Dixon | |
| 2013/0093157 A1 | 4/2013 | Ball | |

\* cited by examiner

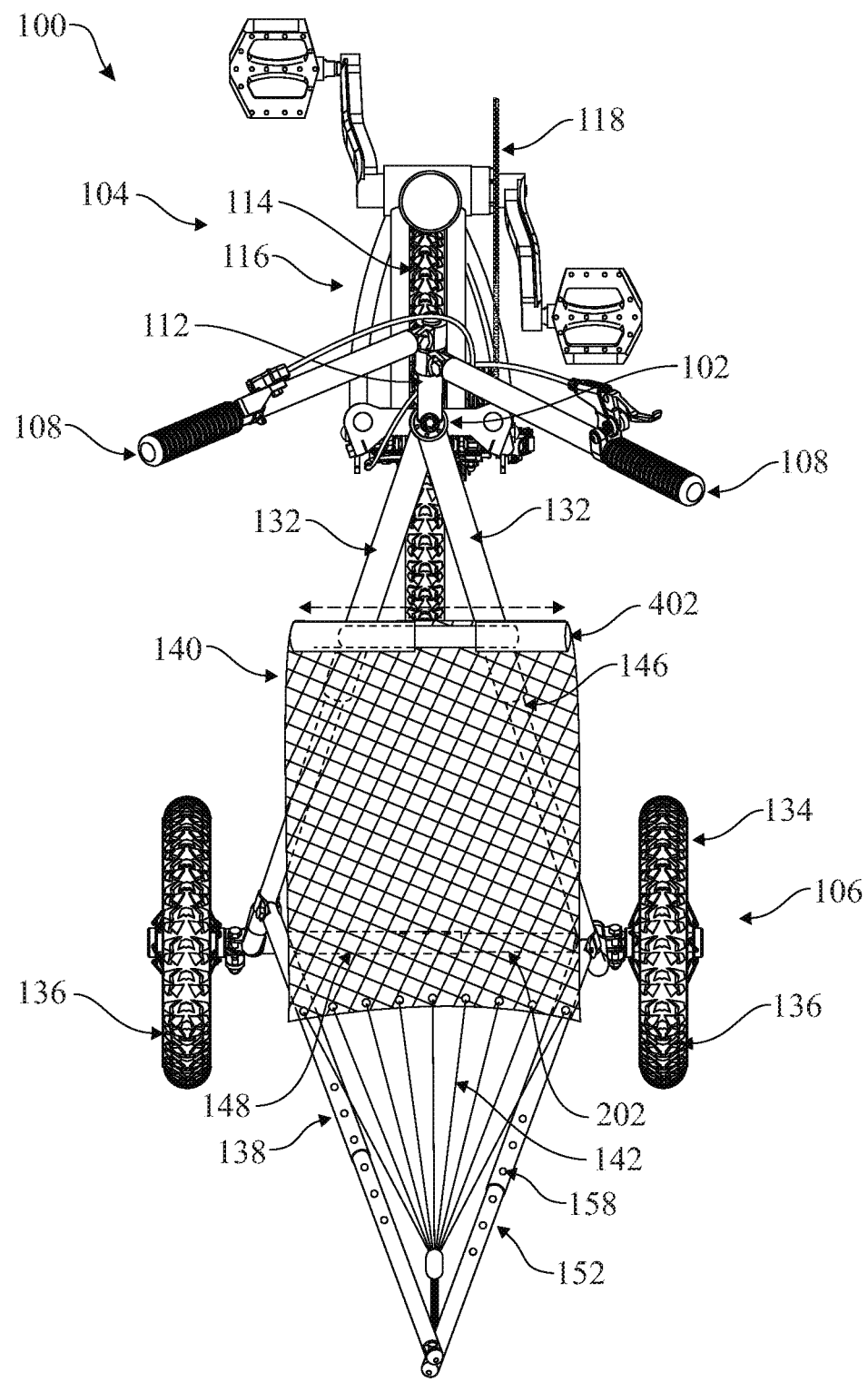

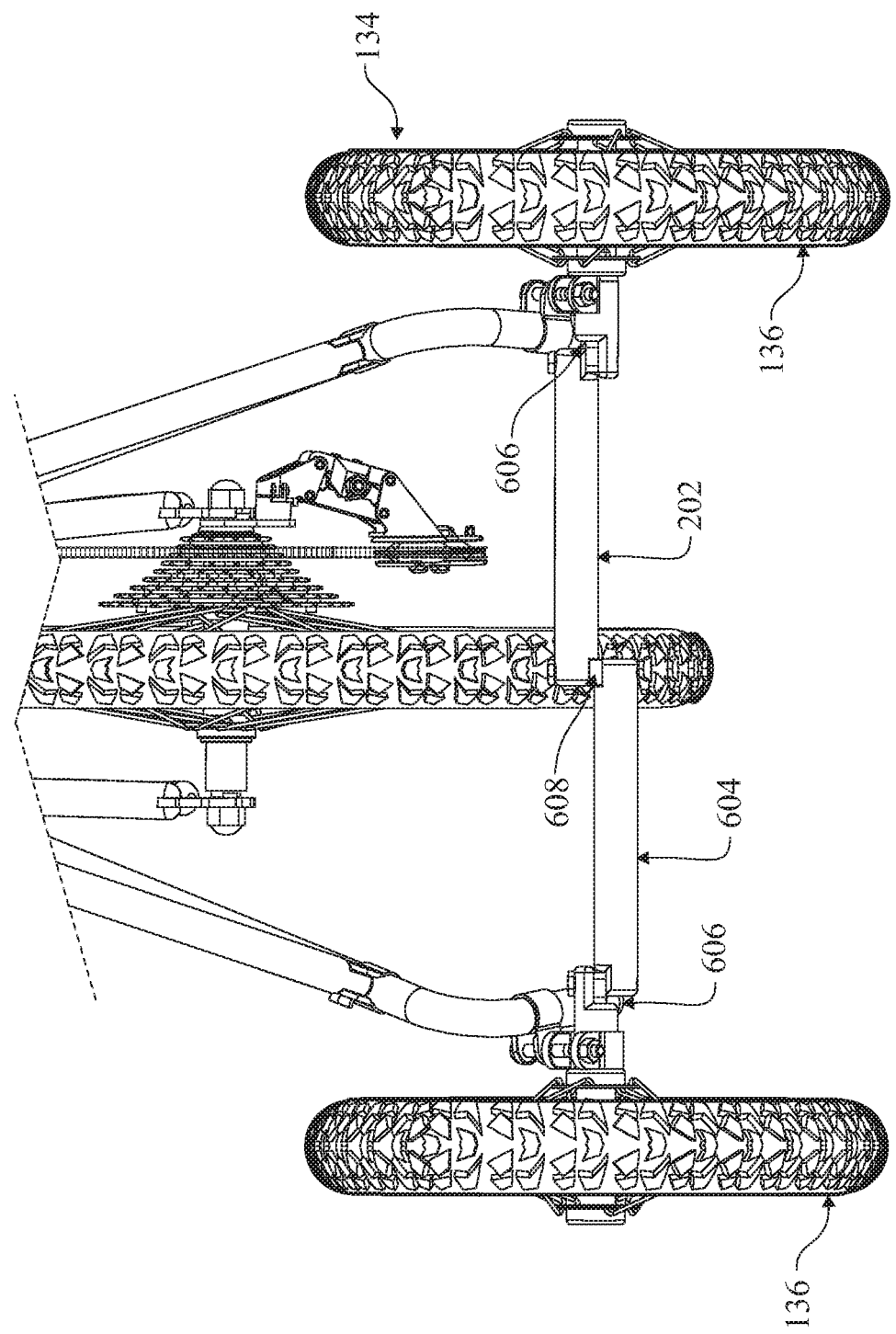

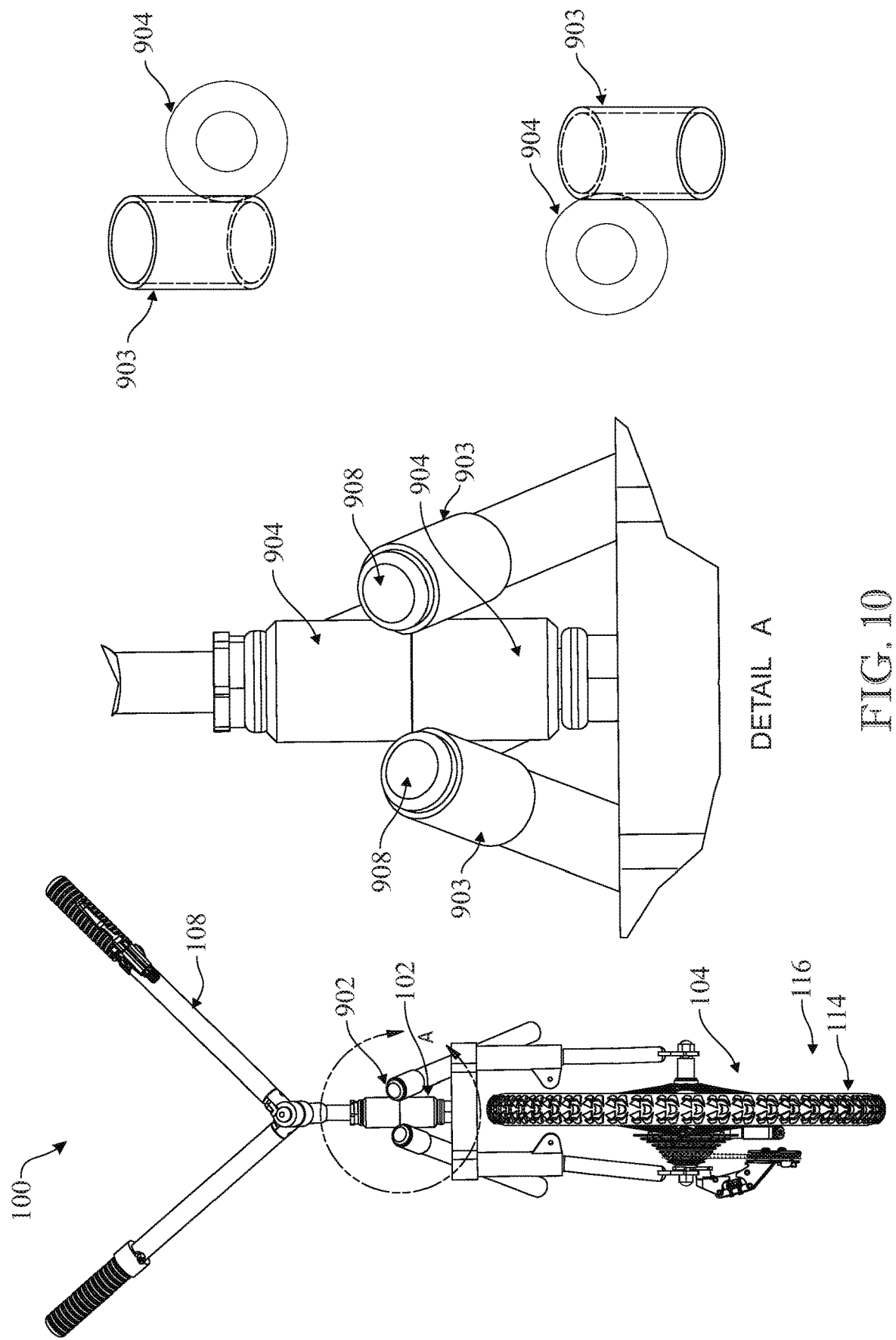

COLLAPSIBLE CYCLE

INDEX TO RELATED APPLICATIONS

This application claims benefit of U.S. Provisional Patent Application No. 62/453,039, filed Feb. 1, 2017, entitled Collapsible Cycle, the disclosure of which is incorporated herein by reference in its entirety.

FIELD OF THE INVENTION

The present invention relates generally to cycle vehicles, and more particularly to a collapsible recumbent cycle.

BACKGROUND OF THE INVENTION

Cycles are popularly used by enthusiasts for a variety of purposes. Nowadays, recumbent cycles are being used by a number of cycling enthusiasts. Many cycling enthusiasts ride and enjoy the comfort and performance of recumbent cycles.

The common configuration of a recumbent cycle includes pedals positioned ahead of, rather than below, the cyclist. This configuration allows the use of a more comfortable reclined seat, which is typically placed lower to the ground than seats found in ordinary cycles.

Sometimes, it may be required to transport these recumbent cycles to different outdoor locations such as beaches, parks, cycling tracks, etc. Since conventional recumbent cycles may tend to be longer in length as compared to regular cycles, it may be difficult and cumbersome to attach the recumbent cycle to a vehicle for transportation or to carry the recumbent cycle by hand. These recumbent cycles may also occupy a large amount of space when not in use, causing storage problems.

As such, there exists a need for an improved recumbent cycle that is configured for easy transportation and storage while providing a comfortable ride.

BRIEF SUMMARY OF THE INVENTION

It is accordingly an object of the invention to provide a cycle, which overcomes the hereinafore-mentioned disadvantages of the heretofore-known cycles of this general type and which allows for easy transportation and storage, while providing a comfortable ride.

With the foregoing and other objects in view there is provided, in accordance with the invention, a cycle that includes a fork and a first wheel is mounted to the fork. A steerer tube is connected to the fork. The steerer tube has a longitudinal axis. The cycle includes a pair of second wheels. A pair of downtubes is rotationally mounted to the steerer tube about the longitudinal axis. The pair of downtubes each have a fixed inclination with respect to the longitudinal axis. Each one of the down tubes respectively connects one wheel of the pair of second wheels to the steerer tube for pivoting the pair of second wheels together and apart.

A further preferred development of the invention may be distinguished in that an adjustable transverse support is mounted between the pair of downtubes.

An added preferred development of the invention may be distinguished in that the support is mounted on the downtubes adjacent the pair of second wheels.

An additional preferred development of the invention may be distinguished in that the transverse support is an axle that carries the pair of second wheels.

Another preferred development of the invention may be distinguished by seat support tubes pivotably connected to one another at a first end. Each of the seat support tubes is connected at a respective downtube of the pair of downtubes at a second end opposite the first end. A hammock seat is mounted between the seat support tubes and the pair of down tubes.

With the foregoing and other objects in view there is also provided, in accordance with the invention, a cycle that includes a fork and a first wheel is mounted to the fork. A steerer tube is connected to the fork. The steerer tube has a longitudinal axis. The cycle includes a pair of second wheels. A pair of downtubes is rotationally mounted to the steerer tube about the longitudinal axis by respective sleeves. The pair of downtubes each are longitudinally displaceable through the respective sleeves to compact the cycle in a longitudinal direction thereof. Each one of the down tubes respectively connects one wheel of the pair of second wheels to the steerer tube to pivot the pair of second wheels together and apart.

An added preferred development of the invention may be distinguished in that the each of the respective sleeves is mounted on respective bushings. The respective bushings are consecutively disposed on the steerer tube.

An additional preferred development of the invention may be distinguished in that the pair of downtubes have a curved extent that corresponds to the first wheel radius.

Disclosed is a cycle including a collapsible down tube assembly connecting a front assembly to a collapsible rear assembly, the front assembly including a steerer tube, a pair of handle bars, a front wheel assembly, and a driving assembly, and the rear assembly including a seat elevation assembly configured to elevate a seat, and a rear wheel assembly.

In another aspect, the seat is suspended between the down tube assembly and the seat elevation assembly.

In another aspect, the down tube assembly is longitudinally collapsible.

In another aspect, the down tube assembly is laterally collapsible.

In another aspect, the down tube assembly is longitudinally displaceable over the front wheel.

In another aspect, the rear wheel assembly is laterally collapsible.

In another aspect, the down tube assembly and the rear wheel assembly are configured to laterally collapse together.

In another aspect, the seat elevation assembly is configured to rotate toward the front assembly to a collapsed configuration.

In another aspect the handle bars are rotatable downward to a collapsed configuration.

In another aspect, the rear assembly includes a collapsible rear axle.

In another aspect, the rear axle includes at least a central hinge to cause a portion of the rear axle to fold.

Although the invention is illustrated and described herein as embodied in a cycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 4 shows a top view of the collapsible cycle in the expanded configuration;

FIGS. 5 and 6 show a back view of a collapsible rear axle in expanded and collapsed configurations, respectively;

FIG. 10 shows a partial front view of the head tube of the collapsible cycle of FIG. 8, showing down tube receivers of a front end of the cycle;

Like reference numerals refer to like parts throughout the several views of the drawings.

DETAILED DESCRIPTION OF THE INVENTION

Figure 1:
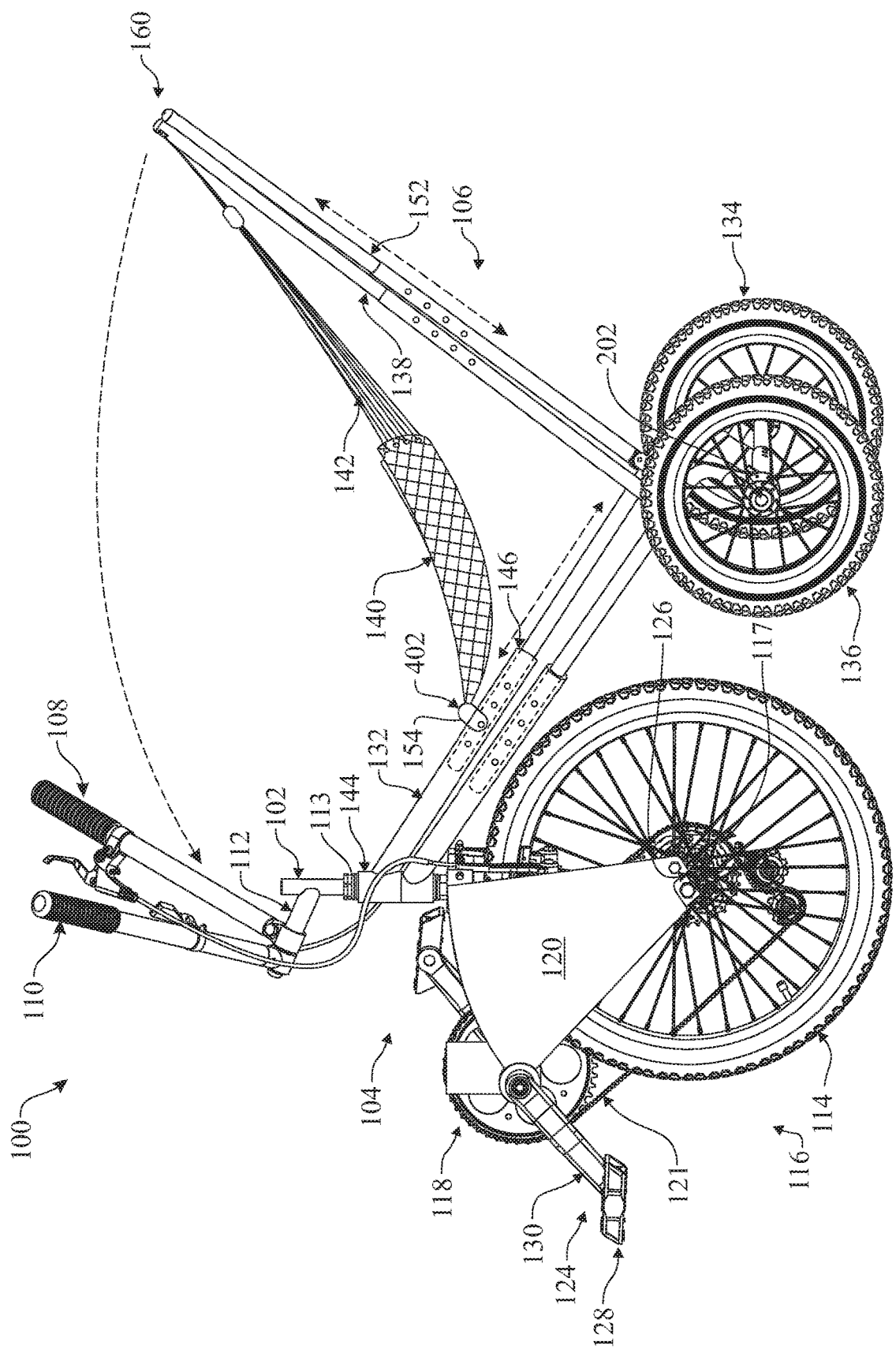
FIG. 1 shows a side view of a collapsible cycle in an expanded configuration.

Referring to FIG. 1, a cycle 100 is illustrated. The cycle 100 is a selectively foldable and collapsible cycle. As shown in the drawings, the cycle 100 may be a recumbent tricycle. The cycle 100 is rideable by cyclists of various age groups, body types, and weights, in various outdoor locations.

The cycle 100 includes a longitudinally and/or laterally collapsible down tube assembly 132 connecting a front assembly 104 of the cycle 100 to a rear assembly 106. The front assembly 104 includes a steerer tube 102, a pair of handle bars 108, a fork 115, a front wheel assembly 116, and a front driving assembly 118. The fork 115 supports the front wheel 114 and the steerer tube 102 is connected to the fork 115. The rear assembly 106 includes a seat elevation assembly 138 configured to elevate a seat 140, and a rear wheel assembly 134. The seat 140 (e.g. a hammock-style seat) may be suspended between the down tube assembly 132 and the seat elevation assembly 138. The down tube assembly 132 may displace forward over the front wheel assembly 116. The seat elevation assembly 138 may rotate toward the front assembly 104 and may longitudinally retract and laterally collapse. The rear assembly 106 may laterally collapse. The handle bars 108 may rotate toward the front wheel assembly 116. The collapsible frame of the cycle may be composed of appropriate materials known in cycle manufacturing such as aluminum, steel (e.g. alloys), plastic, or rubber. However, advanced materials such as fiberglass and/or carbon fiber, allowing the collapsible frame of the cycle 100 to be light weight and strong.

Figure 3:
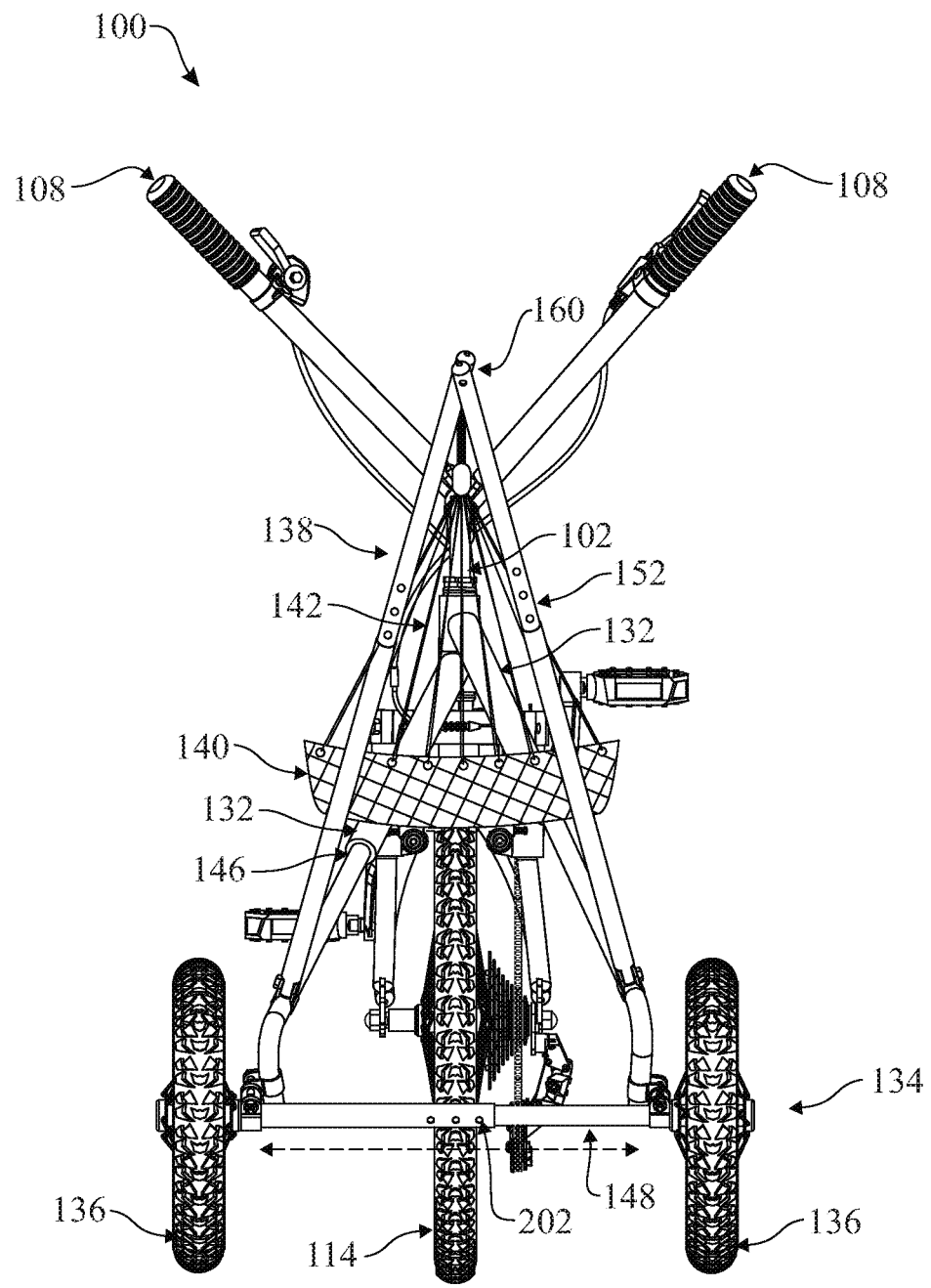
FIG. 3 shows a rear view of the collapsible cycle in the expanded configuration.
Figure 3A:
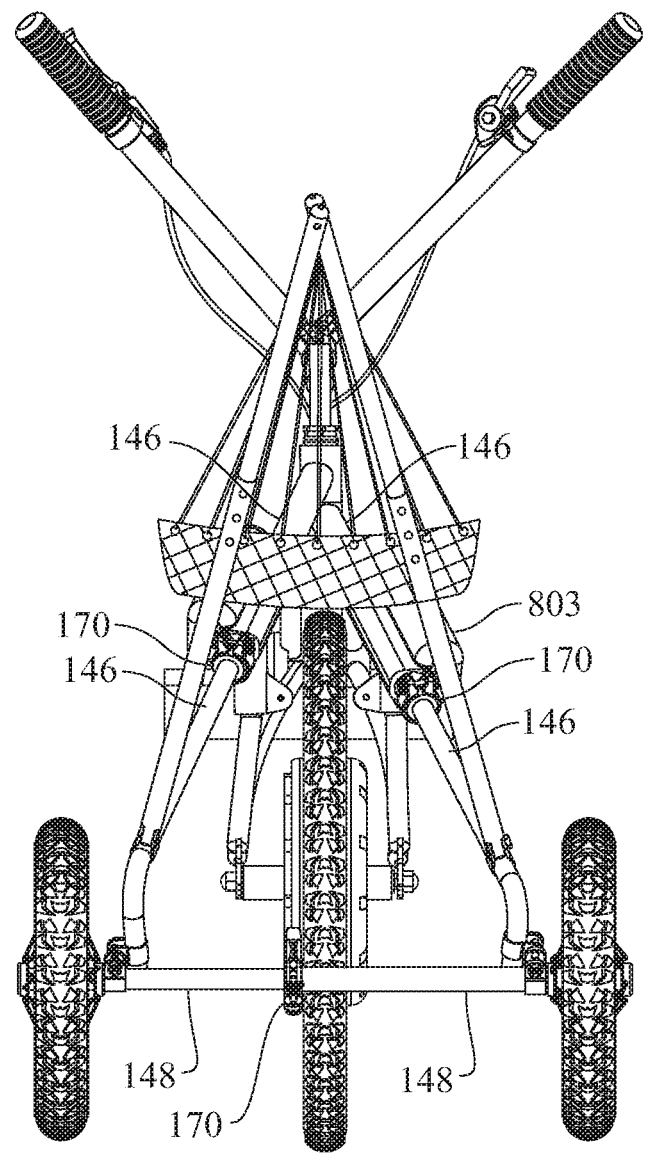
FIG. 3A shows a rear view of another alternant embodiment of the collapsible cycle in the expanded configuration.
Figure 3B:
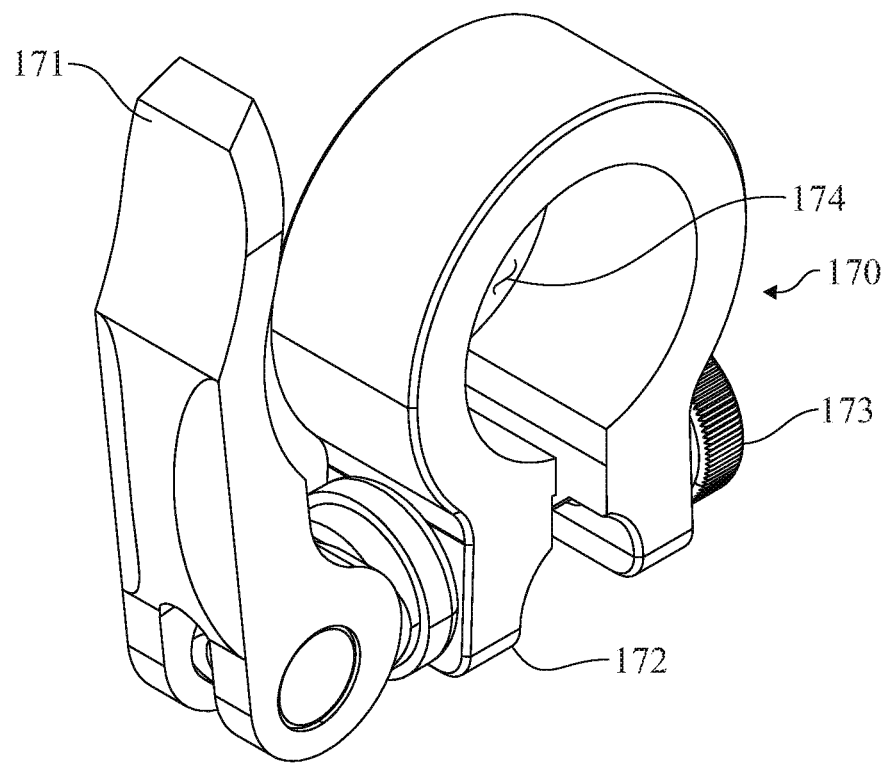
FIG. 3B shows a perspective view of a tube clamp.

As shown in FIGS. 3A and 3B a cam lever clamp 170 is used to secure segments of tubes, e.g. the down tube segments 146 or rear axle segment 148, to one another and fix the length of the tubes to a selected length. Cam lever clamp 170 has a lever 171 that cams against a split ring 172. A screw 173 is threaded to the lever 171 for adjusting the position in which the lever clamps. The outer segment of a tube fits within an opening 174 of ring 172.

It is to be understood that the term "longitudinally" may refer to a general direction of a general longitudinal axis of the cycle 100, where the longitudinal axis extends between the rear assembly 106 and the front assembly 104. Further, the term "laterally" may refer to a lateral direction with respect to the longitudinal axis 100. For example, a horizontal direction may be considered a lateral direction with respect to the longitudinal axis (e.g. extending from side-to-side, left to right, or right to left, or horizontally outward from one lateral side of the cycle). A vertical direction may be referred to a direction from top-to-bottom or bottom-to-top of the cycle (e.g. upward or downward with reference to FIG. 2). As such, the terms "lateral" or "longitudinal" may be referring to FIG. 2, where a lateral direction extends or points from left-to-right or right-to-left, and a longitudinal direction extends or points into or out of the page.

Figure 7:
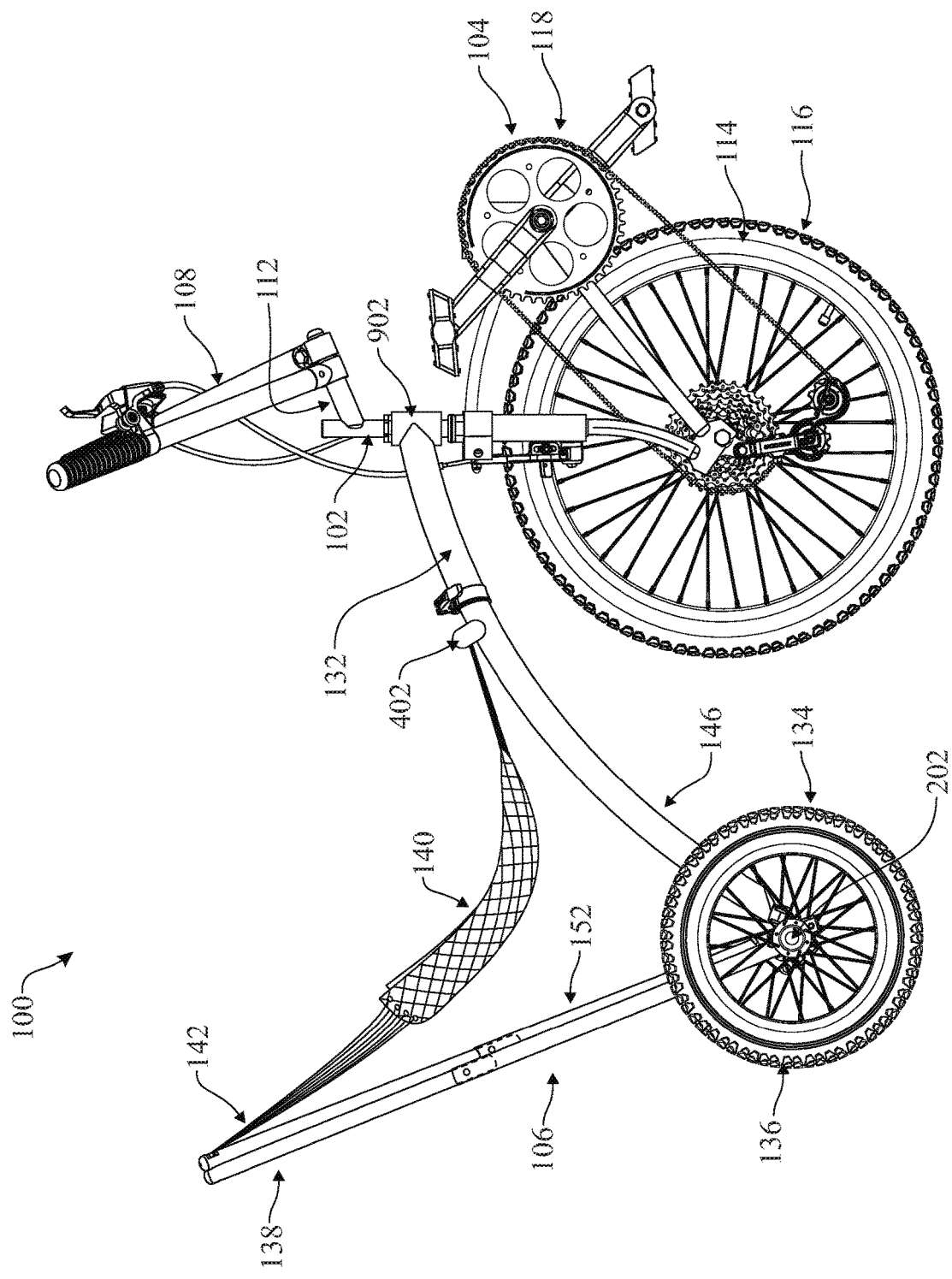
FIG. 7 shows a side view of the collapsible cycle in an expanded configuration where the cycle includes a longitudinally collapsible and displaceable down tube assembly.
Figure 7A:
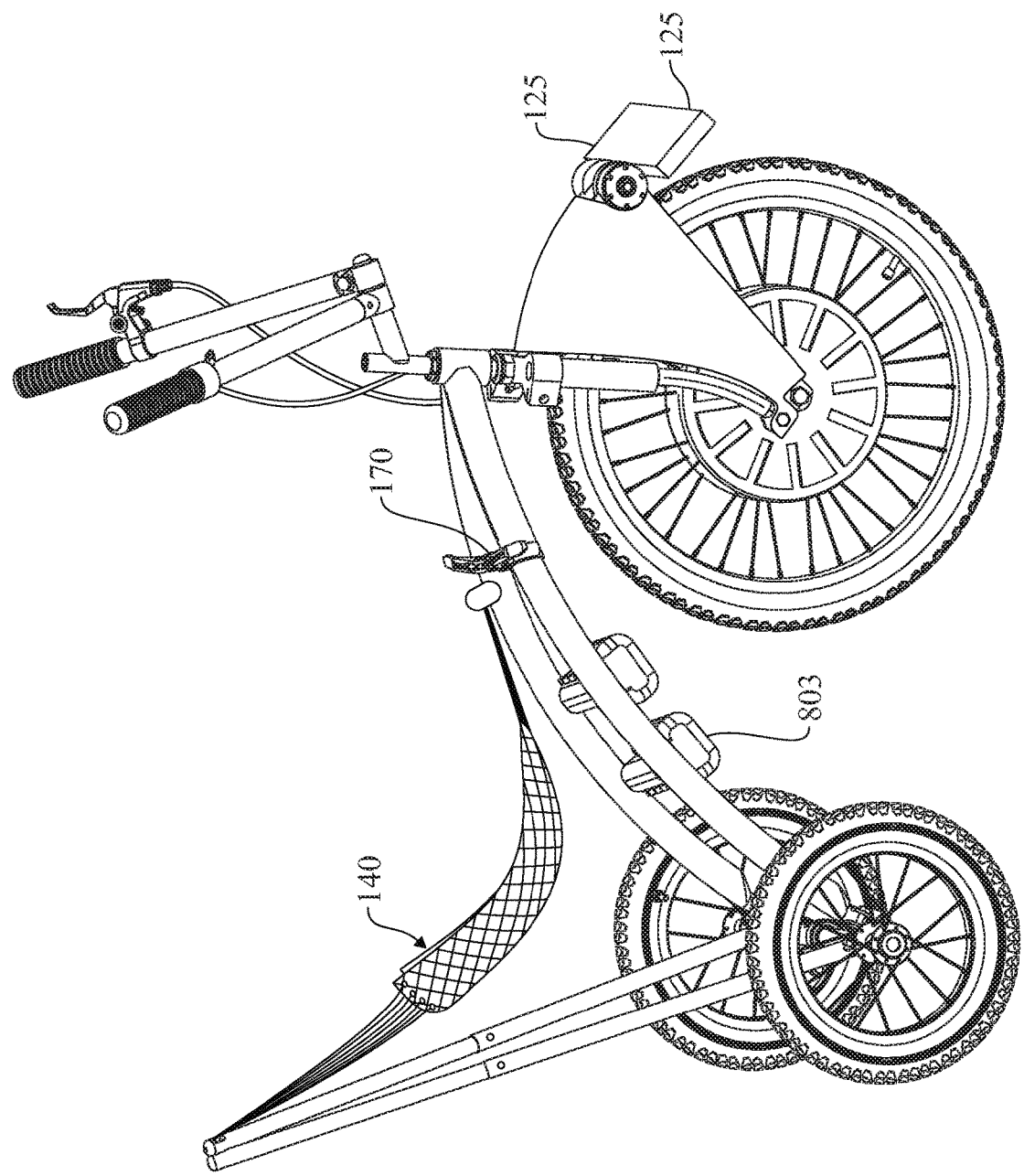
FIG. 7A shows a side view of an alternant embodiment of the collapsible cycle in an expanded configuration where the cycle includes a longitudinally collapsible and displaceable down tube assembly
Figure 8:
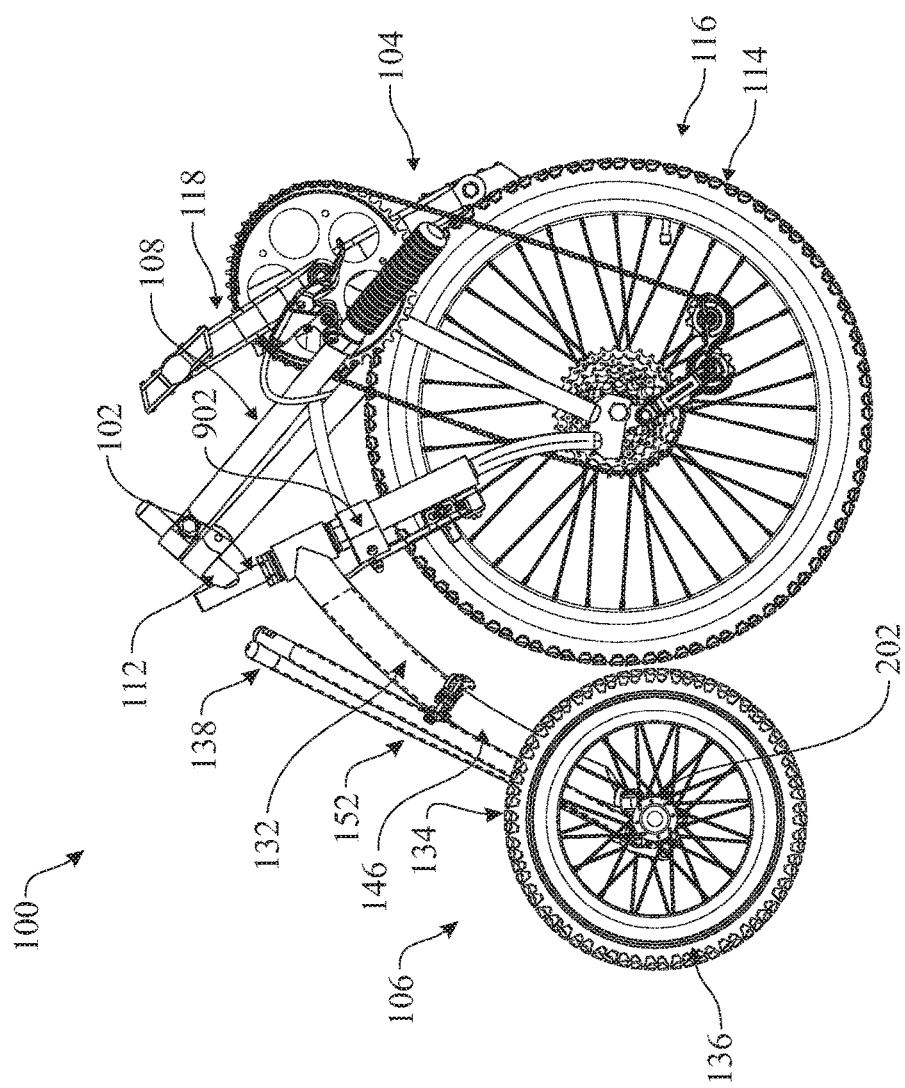
FIG. 8, shows a side view of collapsible cycle of FIG. 7, showing the down tube assembly being longitudinally displaced.
Figure 9:
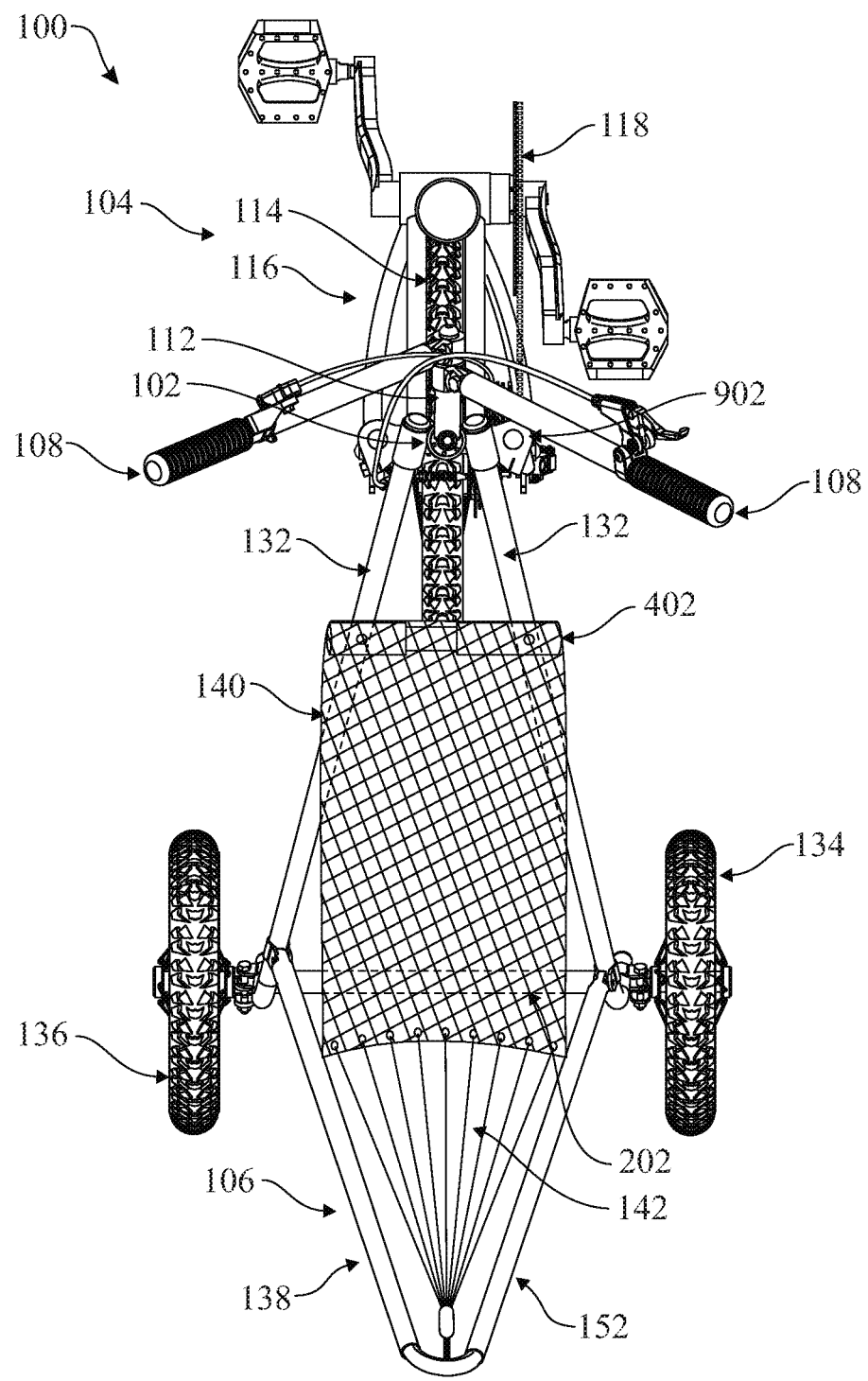
FIG. 9, shows a top view of the collapsible cycle in the expanded configuration.
Figure 9A:
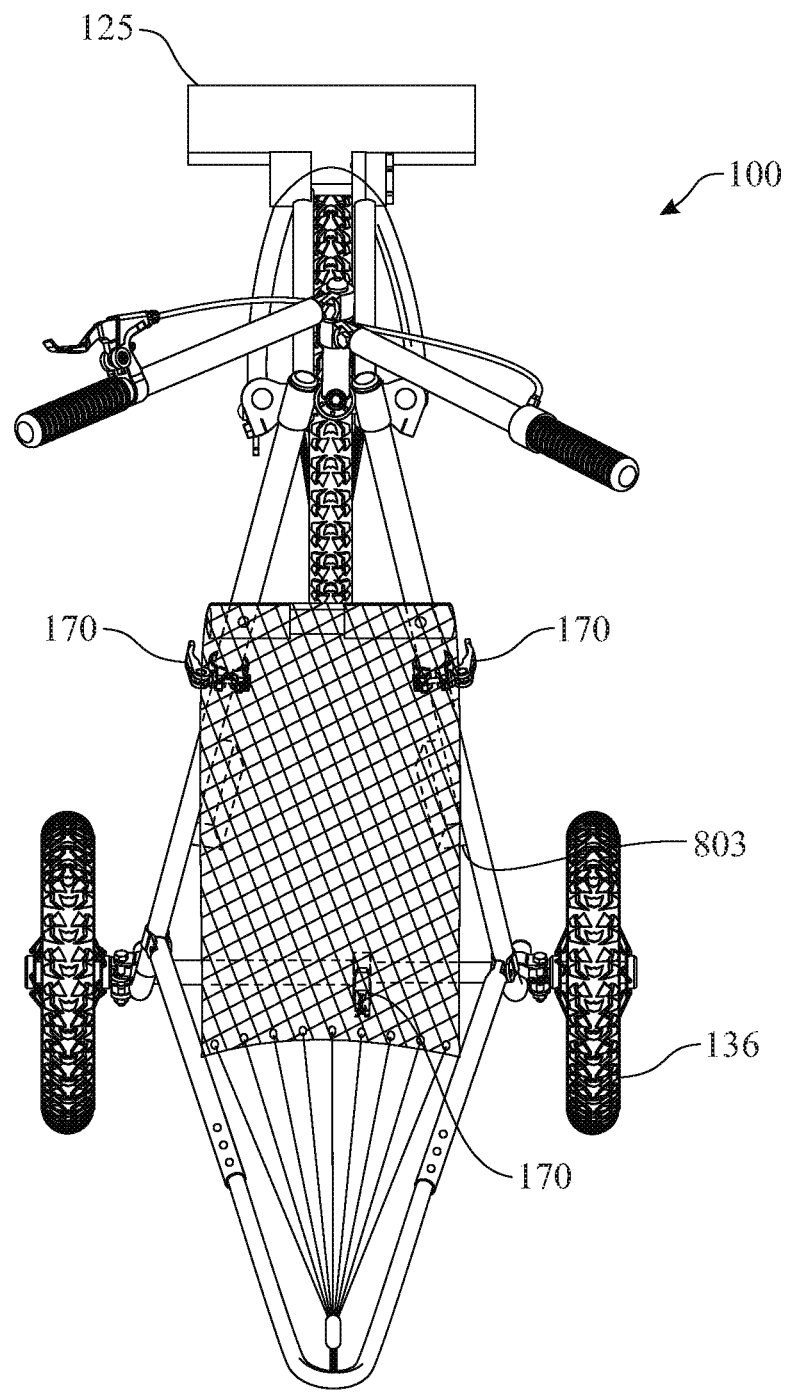
FIG. 9A shows a top view of an alternative embodiment with the of the collapsible cycle.

The rear wheel assembly 134 may include two wheels 136 which may be brought together by collapsing the rear wheel assembly 134, and separated by expanding the rear wheel assembly 134, as shown in FIGS. 5 and 6, FIGS. 11 and 12, and FIGS. 13 and 14. The seat elevation assembly 138 may rotate toward the front assembly 104 (see FIGS. 1-2) to a collapsed configuration of the seat elevation assembly 138. The down tube assembly 132 may collapse longitudinally as shown in FIGS. 7 and 8 or laterally (horizontally) as shown in the sequences shown in FIGS. 11-14. The handle bars 108 may collapse as shown in FIGS. 2, 6, and 7-8. The steerer tube 102 may be attached to handle bars 108 and the front wheel assembly 116 such that the front wheel assembly 116 may be controlled or steered via rotating, controlling, or manipulating the handle bars 108.

The pair of handle bars 108 is provided at the front assembly 104, such that a proximal end of each handle bar 108 is rotatably or pivotably attached, connected, or coupled to the steerer tube 102, such that the handle bars 108 extend upwards (both diagonally upwards) and away from the steerer tube 102, such that the handle bars 108 may be gripped by a user. The handle bars 108 may each have a straight configuration such that the handle bars 108 extend upwards from the front assembly 104 to form a general "V" shape. Alternatively, the handle bars 108 may be bent or curved for ergonomic gripping purposes. Gripping elements 110 may be attached to the handle bars 108 providing gripping ease to a user. For example, gripping elements 110 may be formed of rubber or any material that may aid a user in gripping the handle bars 108. The handle bars may be gripped over- or under-handedly during riding, for comfort or style.

The handle bars 108 may be rotatably attached to a stem 112 of the steerer tube 102 at the front assembly 104. For example, each of the handle bars 108 may be rotatable with respect to the stem 112 or the steerer tube 102 to a collapsed configuration such that the handle bars 108 may be selectively oriented to extend downward toward a front wheel 114 of the front wheel assembly 104. For example, in an expanded configuration of FIG. 1, the handle bars extend upward and/or horizontally (laterally), and in a collapsed configuration of FIG. 8, the handle bars extend downward toward the front wheel 114. This collapsed configuration allows a lateral profile of the cycle 100 to be reduced and compacted toward a central longitudinal axis of the cycle 100. Steerer tube 102 is connected to a fork 115 through bushings 144, the fork 115 supports front wheel 114.

Figure 2:
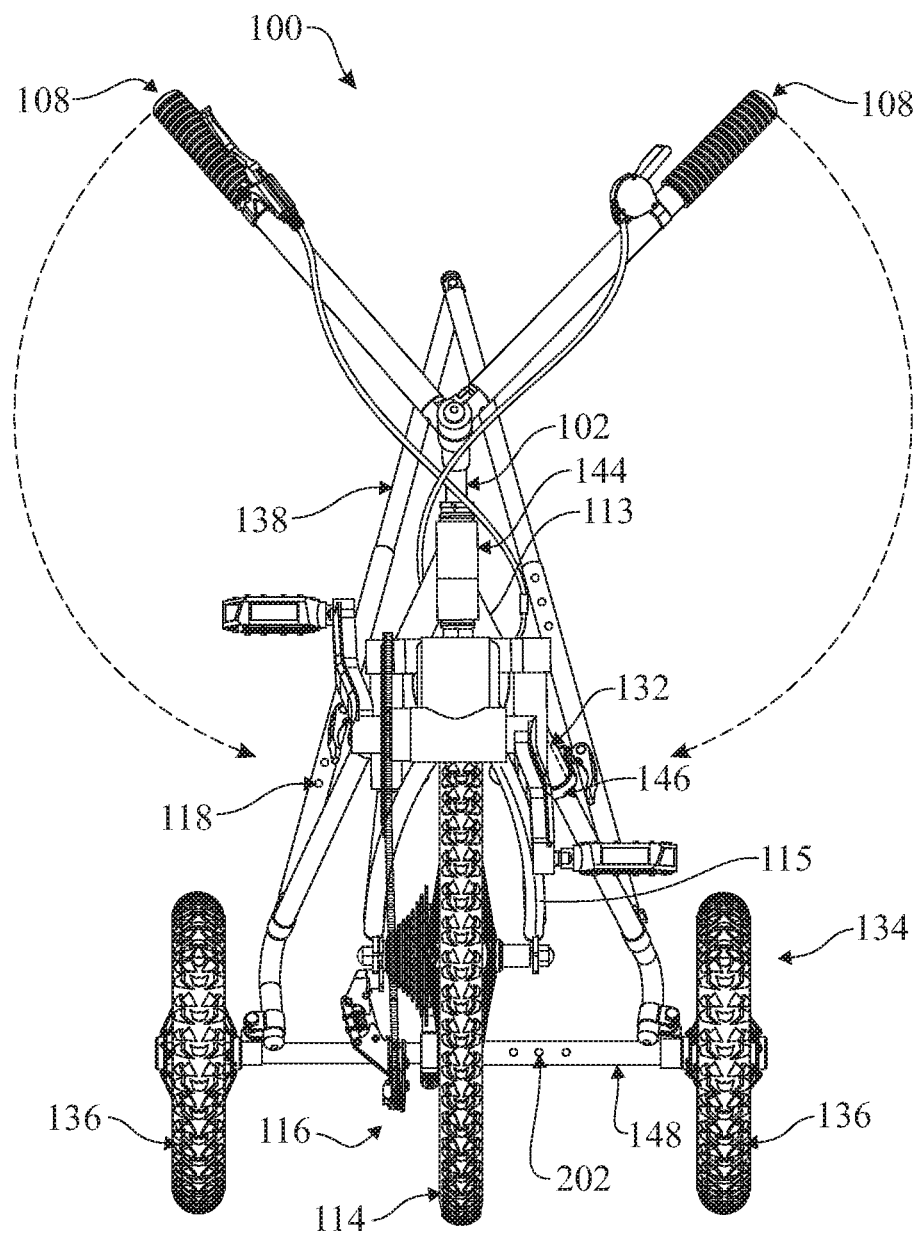
FIG. 2 shows a front view of the collapsible cycle in the expanded configuration.

A variety of mechanisms may be included to collapse the handle bars 108. For example, as shown in FIGS. 1 and 2, the handle bars 108 may be pivotally coupled to steerer tube 102. Referring to FIG. 2, a user may grip each of the handle bars 108 and move or rotate the handle bars 108 in a clockwise and anti-clockwise direction respectively (along the arrows in FIG. 2) to displace, re-orient, move or rotate the handle bars 108 about the stem 112 or steerer tube 102 causing the handle bars 108 to extend downwards and towards the front wheel 114 when collapsed. As another example, a hinge joint may be provided on the steerer tube 102 such that the handle bars 108 may be folded downwards to form an inverted arrangement or inverted "V" shape arrangement. A user may exert a downward or rotationally tangent pushing force on handlebars 108, causing the handle bars 108 to fold or rotate downwards and towards to the front wheel 114 or toward a central longitudinal axis of the cycle 100. Additionally, or optionally, components such as a bell or a brake lever may be attached, coupled, or connected to the handle bars 108 such that these components may be easy to reach, access, trigger or activate by fingers of the user. The handle bars 108 may be selectively lockable in the collapsed and expanded configurations by any appropriate mechanism, such as by operating spring-biased or screw-operated push pins, levers, or clamps. The handle bars 108 can be collapsed or pivoted to a desired position relative to the rest of the cycle 100 (e.g. the steerer tube 102) to accommodate different riding styles or rider sizes or body types.

The front assembly 104 of the cycle 100 further includes a front wheel assembly 116 positioned below the handle bars 108 on an opposite (lower) end of the steerer tube 102. The front wheel assembly 116 includes a front wheel 114 and a driving assembly 118 connected, coupled, or attached to the front wheel 114. The driving assembly 118 may include pedals, cranks, chainrings, a chainwheel, a chain, cogs (i.e. cassette) and a derailleur or any other component required to drive the front wheel 114.

The steerer tube 102 may be attached to the handle bars 108 and the front wheel assembly 116 (e.g. between the front wheel assembly 116 and the handle bar assembly 108) such that steering the handle bars 108 in the expanded configuration of the handle bars 108 may cause the front wheel assembly 116 to rotate for steering the cycle 100. The handle bars 108 are configured to steer (i.e. rotate about a vertical axis of the head tube) the front wheel 114 and the driving assembly 118 about a steering axis which may be coaxial with a vertical portion of the steerer tube 102 (e.g. head tube). The front wheel 114, driving assembly 118, and the handle bars 108, or the entire front wheel assembly 116 may rotate together for steering the cycle 100. As such, a crankset 124 may be configured to pivot due to the turning of the front wheel 114 or the handle bars 108. A rider may turn the front wheel 114 either by rotating the crankset 124 or the driving assembly 118 (e.g. via pedals 128) about a vertical rotational axis with their feet and legs, and/or by hand-steering the handle bars 108.

As shown in FIGS. 1 to 4 the driving assembly 118 may include a mechanical drive train, having a chain stay 120 and chain 121 connected to a pedal-driven crankset 124 for driving the front wheel 114 and the front wheel assembly 116. The driving assembly 118 functions to drive the axle-rotation (about a horizontal axis of the wheel) of the front wheel 114 and may include one or more gears coupled to the chain 121 and the chain stay 120. The front wheel assembly 116 may include a wheel sprocket 117 that is coupled to a hub 126 of the front wheel 114 to allow the crankset 124 to drive the axle-rotation of the front wheel 114 (e.g. for forward and backward movement).

In some embodiments, driving assembly 120 and the downtubes 132 may be configured such that the driving assembly 120 fits or tucks under the downtubes 132 if the front wheel assembly 116 is rotated 180 degrees, therefore providing a smaller profile when viewed from the side (see FIG. 1).

The crankset 124 of the front wheel assembly 116 includes a crank sprocket, a pair of crank arms 130 that are connected through a crank shell, and pedals 128 that extend oppositely from respective ends of the crank arms 130. The crank shell further includes bearings and other hardware that allows the two crank arms 130 to interconnect and rotate. The pedals 128 are operated by the user to turn crank arms 130, similar to a conventional recumbent bicycle, such that the crank arms 130 cooperate to turn the crank sprocket and translate power via chain 120 to the wheel sprocket 117 connected to hub 126 of the front wheel 114. Although the figures show the front wheel being driven by the front wheel assembly 116, the driving assembly may instead, or in combination, be configured to drive the rear wheel or the rear wheel assembly 134.

Figure 15:
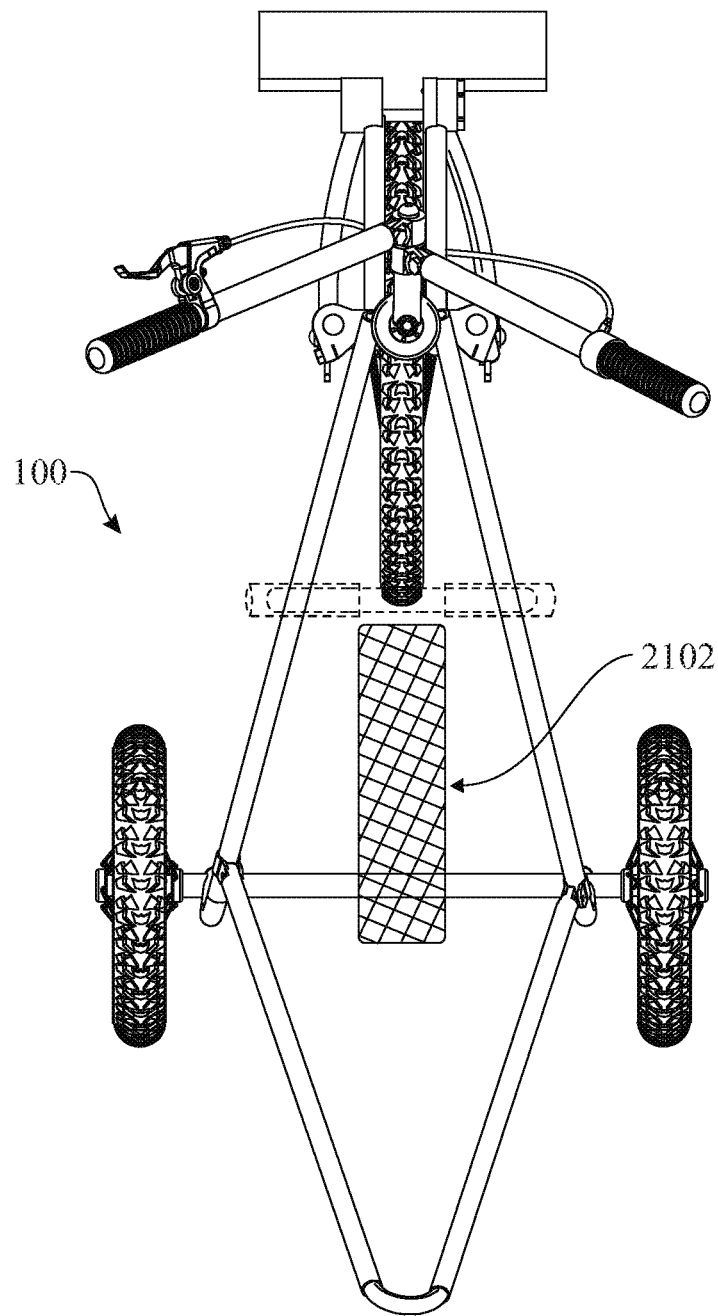
FIG. 15 schematically shows a top view of the cycle including a power supply box module configured to provide power for electrically driving the cycle.

Alternatively or additionally, the driving assembly may include an electric driving assembly including an electric motor provided on, attached to, coupled to, supported on, directly associated with the front wheel assembly 116 of the cycle 100 for rotating and driving (forward/backward) the axle-rotation of the front wheel 114 of the cycle 100 to drive the cycle 100. For example, FIG. 15 schematically shows a top view of the cycle 100 including a power supply box module 2102 configured to provide power for electrically driving the cycle via the electric motor. It is to be understood that the electric motor may drive the front and/or rear wheel assemblies. For example, the electric motor may be provided at the front assembly 104 and/or rear assembly 106 of the cycle 100 proximate to or in the vicinity of the front wheel 114 and/or rear wheels 136 for driving the front wheel 114 and/or rear wheels 136 of the cycle 100. Also, a triggering mechanism for activating or deactivating the electric motor may be provided on the handle bars 108 to allow the user to easily activate and control the electric motor. In the example cycle 100 shown in FIG. 15, manual front pedals are not required and instead the motor solely may drive the wheel assembly. Alternatively, the manual front pedals and the electric motor may drive the wheel assembly concurrently. In some embodiments, one wheel assembly is driven by the electric motor, and the remaining (other) wheel assembly is driven manually via pedals.

Figure 1A:
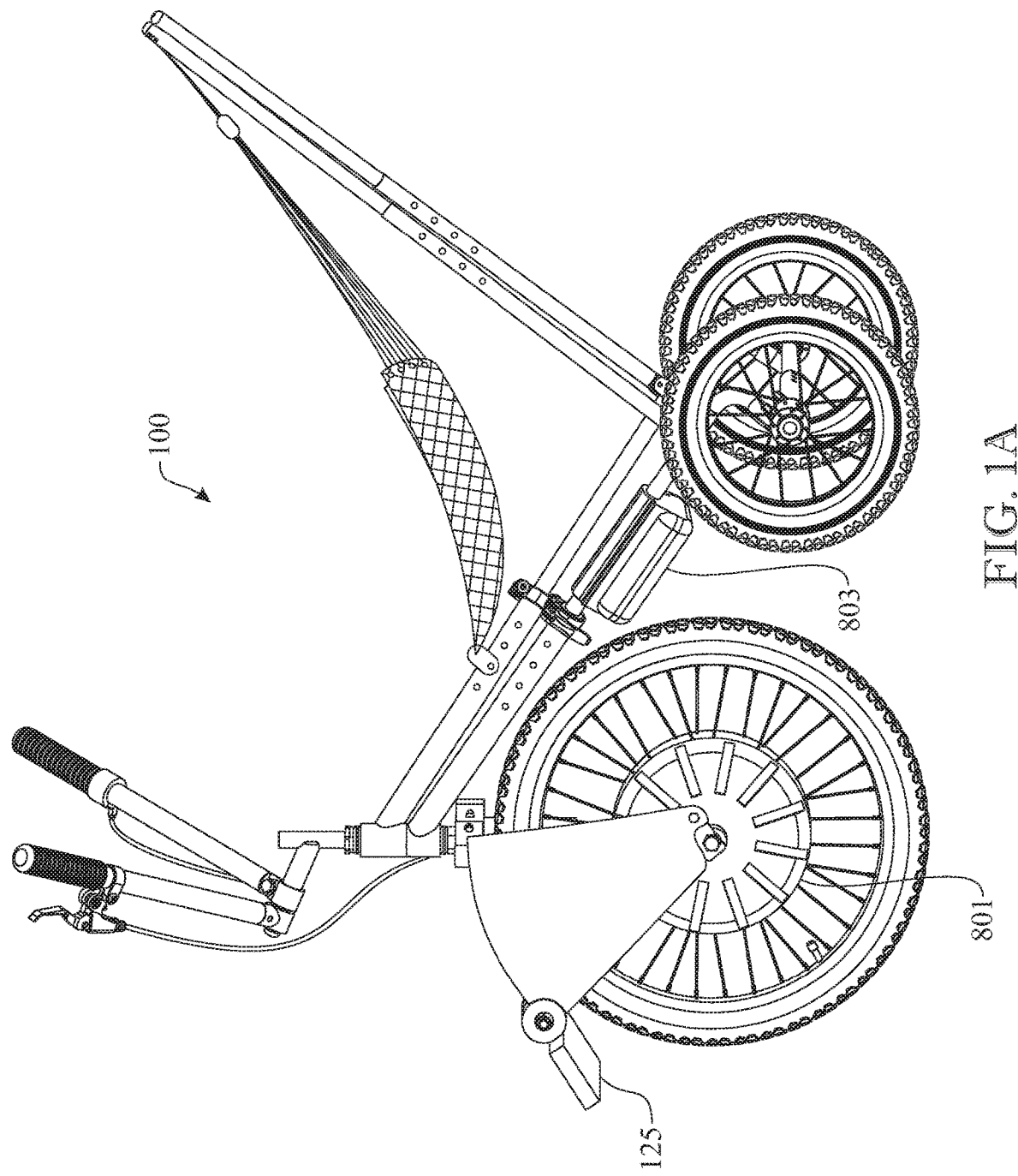
FIG. 1A shows a side view of an alternate embodiment of the collapsible cycle in an expanded configuration.

As shown in FIG. 1A the cycle 100 is shown without pedals, instead foot pegs 125 are provided for supporting a rider's feet. In this embodiment, an electric drive 801 connected to a rechargeable battery 803, powers the cycle 100.

The down tube assembly 132 may be attached to, coupled to, or connected to the steerer tube 102 (e.g. to the head tube). Referring to FIGS. 1-4 and 7-15, the down tube assembly 132 extends from the front assembly 104 of the cycle 100 towards the rear assembly 106 of the cycle 100 and may be attached to a rear wheel assembly 134 or a rear axle 202 connecting the wheels 136 of the rear wheel assembly 134. The rear axle 202 may be positioned such that the rear axle 202 is perpendicular to a longitudinal axis of the cycle 100 and is parallel or co-axial with an axle or horizontal rotational axis of the rear wheels 136.

Figure 11:
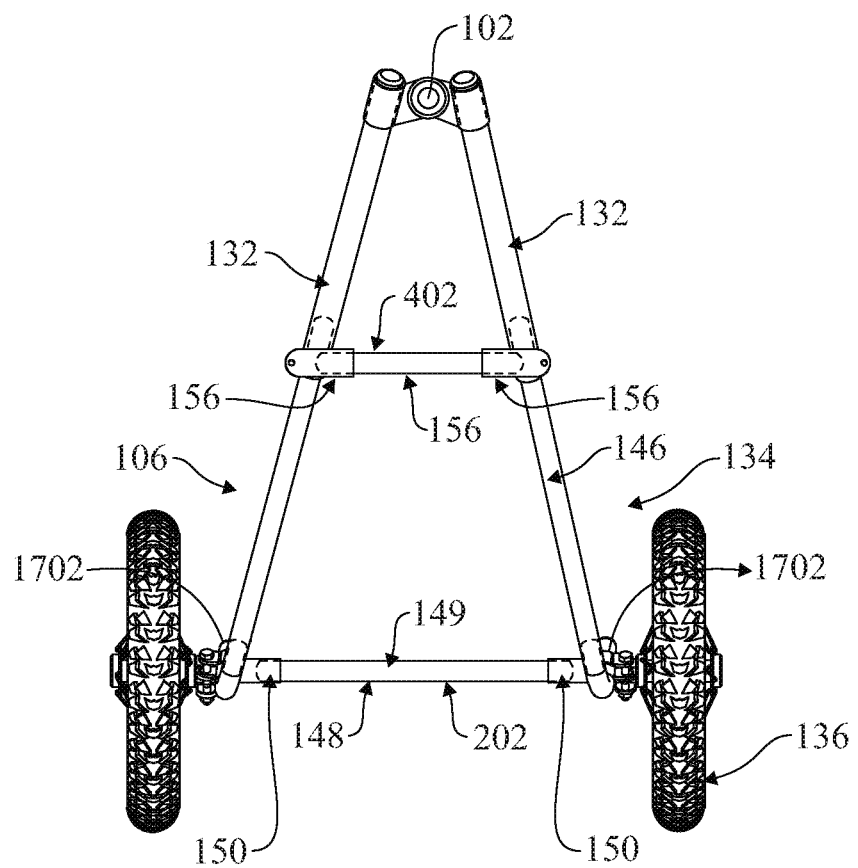
FIG. 11 schematically shows a partial top view of the rear axle in an expanded configuration and the down tubes in a laterally expanded configuration.

As shown in at least FIGS. 1 and 11, the down tube assembly 132 may include two down tubes 132 that are rotatably or pivotally connected to the steerer tube 102 (e.g. the head tube) at a front end of the down tubes 132, and rotatably or pivotally connected to the rear assembly 106 at a rear end of the down tube assembly 132. Connection points of the down tubes 132 at the rear assembly 106 may be separated by a distance (see connection points 1702 in FIG. 11). As shown in FIGS. 3, 5, 6, and 11-14 the rear assembly 106 may collapse inward (e.g. collapse along an axle 202 of the rear wheels 136). Collapsing the rear assembly 106 may cause a distance between the rear wheels 136 to be reduced. Expanding the rear assembly 106 may cause a distance between the rear wheels 136 to increase. The down tubes 132 may be rotatably attached to the rear wheel assembly 134 or the rear assembly 106 (see FIGS. 11-14) or the rear axle 202.

In one example, as shown in FIGS. 1-4, the down tube assembly 132 may be attached to the steerer tube 102 (headtube) in a vertically stacked configuration. For example in FIGS. 1-4 the down tubes 132 are stacked and rotatably attached at the steerer tube 102 and are each rotatable about a vertical axis of the steerer tube 102. In the example of FIGS. 1-4, the front ends of the down tubes 132 include bushings 144 that are vertically stacked at the steerer tube 102 and rotatably attached such that the bushings 144 rotate about a vertical axis of the steerer tube 102. The bushings 144 form a head tube 113. Therefore, the bushings 144 allow the down tubes 132 to rotate about a vertical axis of the steerer tube 102, since the bushings 144 are fixed relative to the down tubes 132. Since the down tubes 132 are also rotatably attached to the rear assembly 106 (e.g. attached spaced apart at the rear assembly 106), and since the rear assembly 106 may laterally collapse as described above, an angle between the down tubes 132 may be modified (e.g. reduced or increased) by laterally collapsing or expanding the down tube assembly 132 and/or the rear assembly 106. As such, the down tube assembly 132 and the rear assembly 106 laterally expand and collapse together. It is to be understood that the down tubes 132 may be attached to any appropriate portion of the rear assembly 106. For example, the rear ends of each down tube 132 may be attached in a spaced-apart fashion to the rear axle 202 (or alternatively a separate crossbar) of the rear assembly 106 as shown in FIGS. 11-14.

In another example, as shown in FIGS. 7-14, the down tubes 132 may be attached to two down tube receiving structures 902 at the steerer tube 102. The down tube receiving structures 902 may be configured to receive each down tube 132 respectively such that the down tubes 132 may longitudinally pass through sleeves 903 defined by each of the down tube receiving structures 902 respectively on each opposite lateral side of the headtube of the steerer tube 102. The sleeves 903 may define a longitudinally or forward facing bore 908 (see FIG. 10) such that the bore 908 rotates with the sleeve 903 when the sleeve 903 rotates. For example, a down tube 132 may longitudinally be displaced or translated through the sleeve 903 (e.g. along a longitudinal axis of the cycle 100) bringing forward the entire rear assembly 106 and the down tubes 132 and subsequently collapsing the cycle 100 in a longitudinal direction. As shown in FIGS. 7 and 8, the down tubes 132 may be curved (downward concave) to be displaced forward to curve over the front wheel 114 (e.g. generally matching a curvature of the front wheel). Upon the down tube assembly 132 being extended over the front wheel 114, the rear wheels 136 may be raised vertically upwards and at an inclination with respect to the front wheel 114 (see FIG. 14).

FIG. 10 shows a front view of the sleeves 903. The sleeves 903 may be rotatable about a vertical axis of the steerer tube 102 (headtube) to allow the down tube assembly 132 to be laterally collapsed and expanded (e.g. changing an angle between the down tubes 132).

As such, the down tube assembly 132 may be longitudinally or laterally collapsed. Longitudinally bringing forward the down tube assembly 132 may be executed after the rear assembly 106 is collapsed such that the down tubes 132 may be first brought to a parallel, laterally collapsed configuration (FIG. 12) before being displaced through the sleeves 903.

The sleeves 903 may be laterally co-planar such that the down tubes 132 connect to the sleeves 903 on each opposite side of the steerer tube 102 or head tube without a horizontal misalignment of the sleeves 903 (e.g. the sleeves 903 are horizontally aligned). The sleeves may be fixedly attached to bushings 904 (having vertically aligned bores) that are rotatably attached to the steerer tube 102 in a stacked configuration such that the bushings 904 may be rotated about the steerer tube 102 to cause the sleeves 903 to rotate about the steerer tube 102 and subsequently laterally pivot the down tubes 132 (e.g. change an angle between the down tubes 132). Each bushing 904 may support one sleeve 903 and one down tube 132. For example, in FIG. 10, a top bushing 904 may have a downwardly attached sleeve 903, and a bottom bushing 904 may have an upwardly attached sleeve 903 such that the sleeves 903 are horizontally aligned.

Further, each down tube 132 of the down tube assembly 132 may be adjustable along at least one dimension (i.e. a length of a down tube 132 may be adjusted.) For example, the down tube 132 may include a telescopic configuration, such that a length of the down tube 132 may be adjusted by extending or retracting a telescoping structure (e.g. arm 146) of the down tube 132 to adjust a length of the down tube assembly 132, and for adjusting a distance between the rear assembly 106 and the front assembly 104 to longitudinally collapse the cycle 100. This telescoping function of the down tubes 132 is shown at least in FIG. 1. For example, a down tube 132 may include one portion that includes an internal bore that is configured to receive another smaller diameter portion of the down tube 132 for allowing the down tube assembly 132 to be adjusted by sliding the smaller diameter portion through the internal bore. The various telescoping portions of the down tubes 132 may be referred to herein as segment 146. It is to be understood that the segment 146 of the down tubes 132 may have a matching curvature such that a curved inner segment 146 may translate into a curved outer segment 146 or vice-versa.

The telescoping segments 146 of each of the down tubes 132 may be held in place with respect to one another via a spring-biased push-pin which may be received in various holes of a paired segment 146, such that the user may disengage the push-pin to push the segments 146 towards each other or away from each other (longitudinally) for retracting and extending the down tube assembly 132 respectively.

Turning to FIGS. 5-6, and 11-14, the rear wheel assembly 134 includes a pair of rear wheels 136 that are connected to each other via a collapsible rear axle 202. In some implementations, the rear wheels 136 are solid and formed of polyurethane, rubber, plastic, or nylon. In other implementations, the rear wheel 136 includes a pneumatic tire placed around a rim. The rear wheels 136 may be smaller in size than the single front wheel 114. In the expanded configuration, the rear wheels 136 are spaced apart with respect to the front wheel 114 to maintain a required balance to prevent the cycle 100 from toppling or falling over while supporting a rider.

Figure 12:
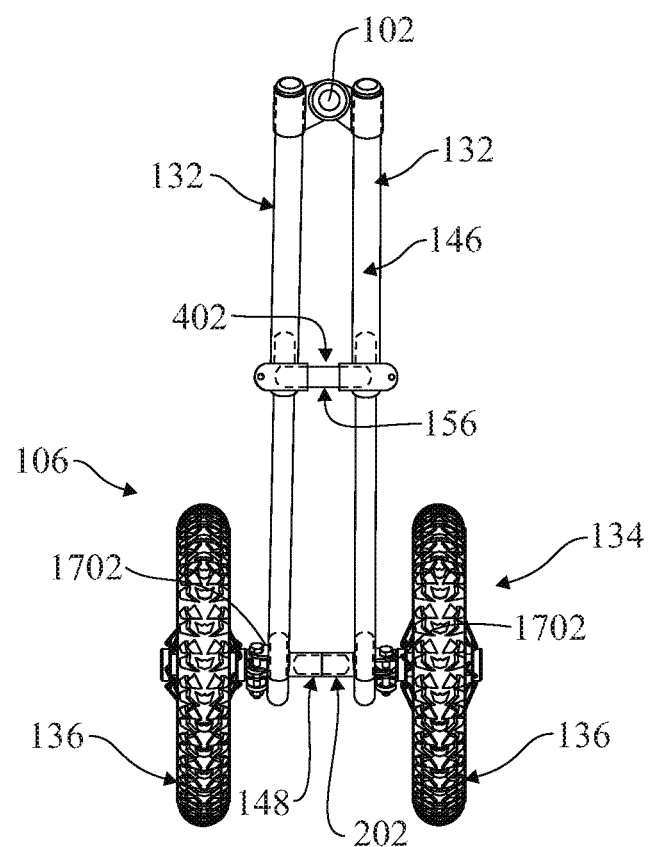
FIG. 12 schematically shows a partial top view of the rear axle in a collapsed configuration and the down tubes in a laterally collapsed configuration.
Figure 13:
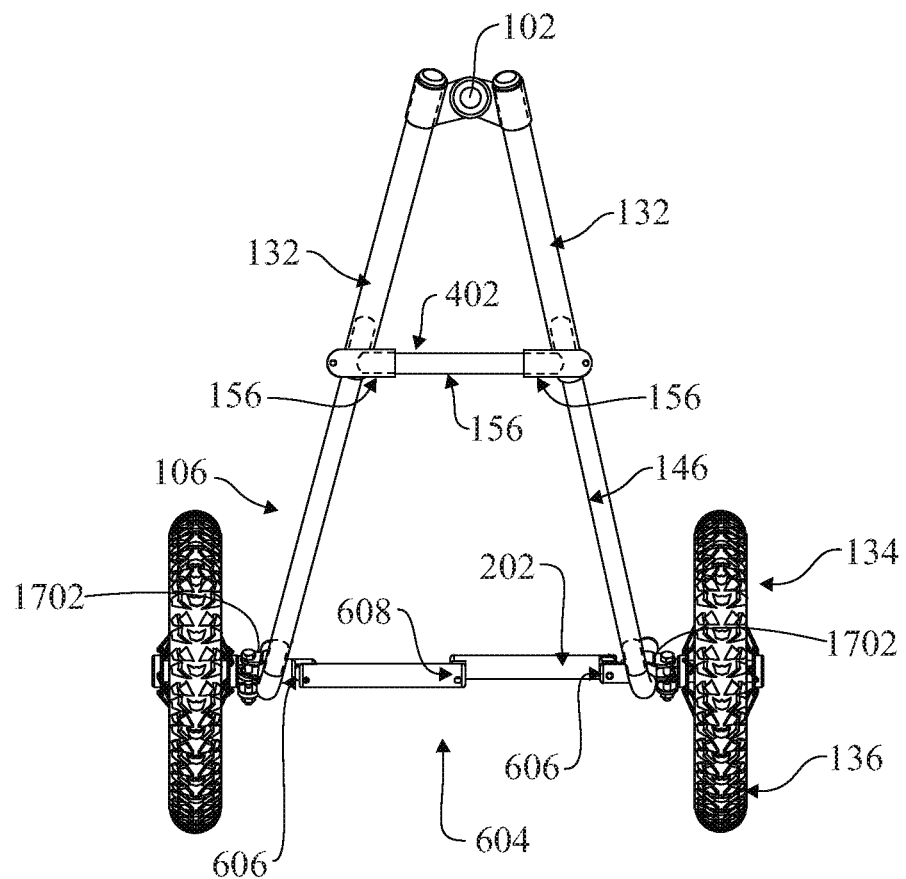
FIG. 13 schematically shows a partial top view of a second example of the rear axle in an expanded configuration and the down tubes in a laterally expanded configuration.

The rear axle 202 is adjustable along at least one dimension, i.e. a length of the rear axle 202. For example, as shown in FIGS. 3, 11, and 12, the rear axle 202 may have a telescoping configuration similar to that of the down tubes 132, such that telescopic segments 148 of the rear axle 202 may be pushed towards each other, causing the telescopic segments 148 to unlock and slide into or over one another for retracting or expanding the rear axle 202 to move the rear wheels 136 toward or away from each other, reducing or increasing a distance between the rear wheels 136 for laterally collapsing or expanding the cycle 100. For example, a central arm 149 of arms 148 may slide into and out of tubular axle portions 150 of the wheels for collapsing and expanding the rear axle 202.

Figure 6:
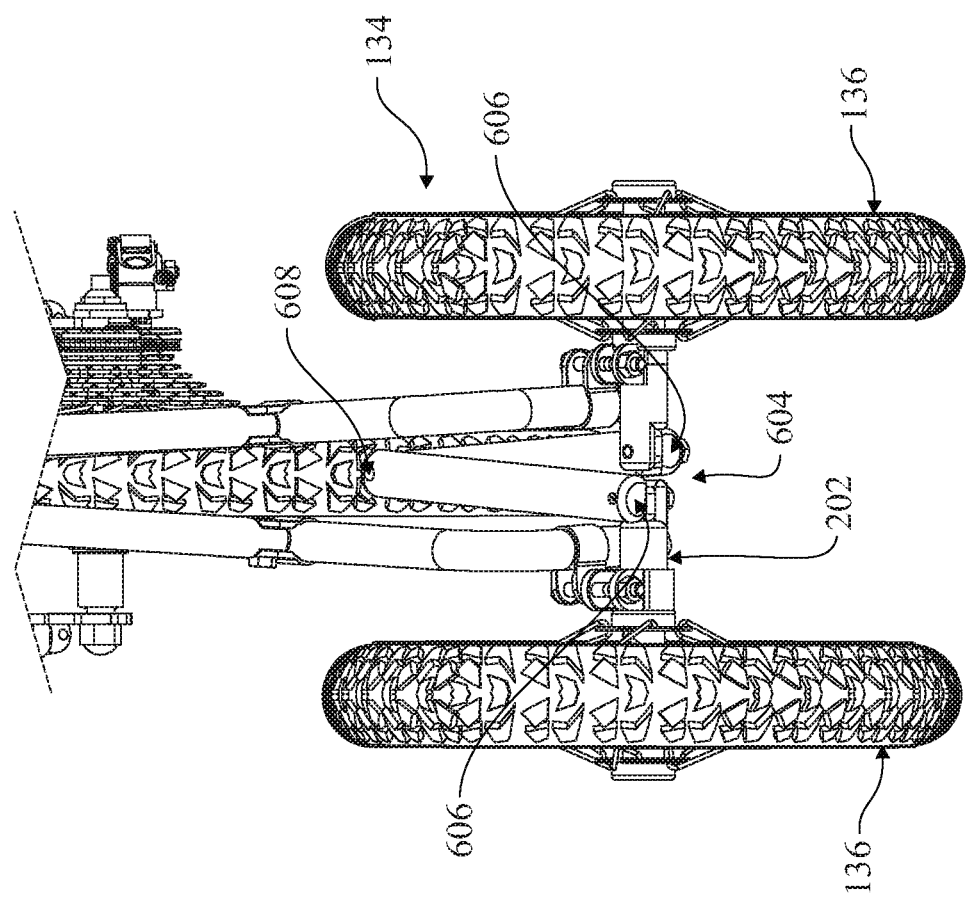
Figure 14:
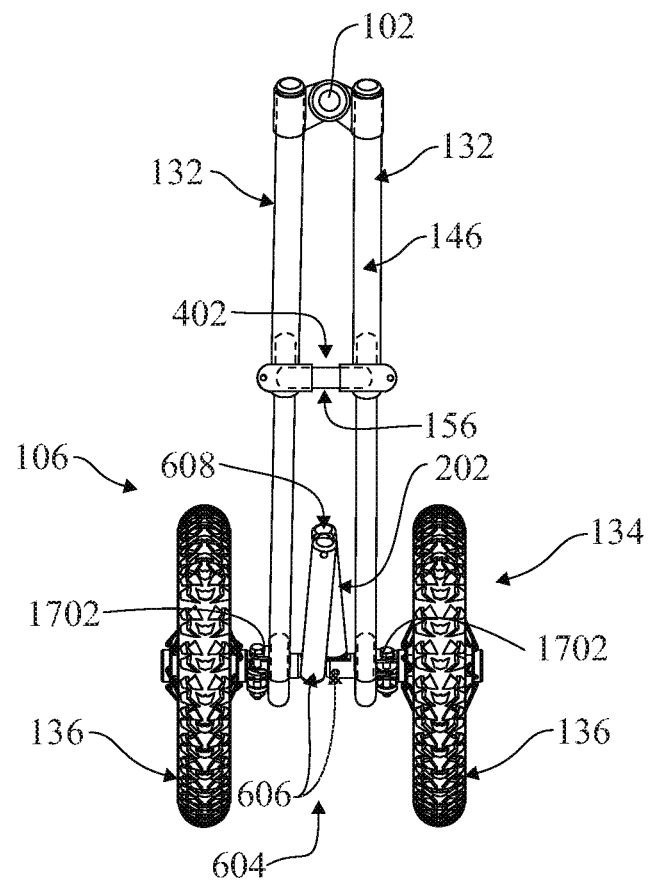
FIG. 14 schematically shows a partial top view of the second example of the rear axle in a collapsed configuration and the down tubes in a laterally collapsed configuration.

In another example, as shown in FIGS. 5, 6, 13 and 14, the rear wheel axle 202 may alternatively include a hinge joint assembly 604 for adjusting a distance between the wheels 136. Such a hinge joint assembly 604 may include a set of hinges 606 (e.g. three hinges), such that the hinges 606 may be operated to alter the distance between the wheels 136. As shown, the hinges 606 may all lie in a collinear arrangement between segments of the rear axle 202 when the distance between the wheels 136 is at a maximum or when the rear axle 202 is at an extended position. The rear wheels 136 may be pushed towards each other for reducing the distance between the rear wheels 136 in order to laterally collapse the cycle 100. As shown in FIGS. 6, and 14, a central hinges 608 may move laterally upwards (or downwards) forming a "V" type configuration of the rear axle 202, causing a reduction in the length of the rear axle 202 for retracting the rear axle 202. For example, three interconnected hinges 606 may be provided on the rear axle 202, connecting segments of the rear axle 202, where a central hinge 608 may be laterally displaced to cause two adjacent hinges 606 and subsequently the wheels 136 to be brought closer to one another, reducing a distance between the wheels 136.

As described above, collapsing the rear axle 202 causes the down tube assembly 132 to laterally converse or compress. Alternatively, expanding the rear axle 202 causes the down tube assembly 132 to laterally expand. The down tube assembly 132 may be rotatably attached to the rear axle 202 at hinge points 1702 shown in FIGS. 11-14 allowing the down tubes 132 to rotate with respect to the rear assembly 106.

Referring to FIGS. 1 to 4, a seat elevation assembly 138 extends upwards and away from the rear axle 202, such that a distal end of the seat elevation assembly 138 converges at a top rear end 160 of the cycle 100. In some embodiments, as shown in FIGS. 1 to 11, the seat elevation assembly 138 may be adjustable along at least one dimension, i.e. a length. The seat elevation assembly 138 may have a telescopic configuration such that telescopic segments 152 of the seat elevation assembly 138 may be pulled apart from each other to extend the length of the seat elevation assembly 138 or the telescopic arms 152 may be pushed towards each other to reduce the length of the seat elevation assembly 138 (see arrows in FIG. 1). It is to be understood that although a hammock-style seat is shown in the figures, a solid rigid seat may be included, where the solid rigid seat is rigidly coupled (or couplable) to the down tube assembly 132 and/or the seat elevation assembly 138.

A seat 140 may be securable or secured between the seat elevation assembly 138 and the down tube assembly 132. For example, as shown in FIG. 1, the seat 140 is secured at a top end 160 of the seat elevation assembly 138. A vertical height of the seat 140 may be adjusted by adjusting the length of the seat elevation assembly 138 for user comfort. The seat 140 may be made of fabric or any other suitable stretchable, strong, and/or flexible material such that the seat 140 may be folded or compressed easily for transporting the cycle 100. Referring to FIGS. 1, 3 and 4, the seat 140 may be suspended from or at least partially attached to the seat elevation assembly 138 using supporting threads 142 for holding and suspending the seat 140 in place. In some embodiments, the seat may be removably attached to the down tubes 132 via straps 154 as diagrammatically shown in FIG. 1.

Further, a telescopic seat support member 402 may be attached between the down tubes 132 proximate to the front assembly 104 of the cycle 100 for receiving, holding, and supporting a front end of the seat 140. Referring to FIGS. 1 and 4, the telescopic seat support member 402 may be provided above or on top of the down tube assembly 132 such that opposite ends of the telescopic seat support member 402 may be fixedly attached to each of the down tubes 132 respectively. The telescopic seat support member 402 is parallel to the rear axle 202 (see FIG. 4). A length of the telescopic seat support member 402 may be adjusted in response to lateral adjustments of the down tubes 132 causing the telescopic seat support member 402 to extend when the down tube assembly 132 is expanded causing the rear wheels 136 to expand, or causing the telescopic seat support member 402 to retract when the down tube assembly 132 and the rear wheel assembly is laterally collapsed. Also, in some embodiments, the telescopic seat support member 402 may be capable of sliding upwards and downwards along a length of the down tube assembly 132 along the arrows shown in FIG. 1 to facilitate collapsing of the cycle 100, or for adjusting a position of the seat 140 for user comfort. The telescopic seat support 402 may include telescoping segments 156 as shown in FIGS. 11-14. The down tubes 132 may be rotatably attached to the telescopic seat support 402 to allow the down tubes 132 to rotate freely upon laterally collapsing.

It is to be understood that the telescoping structures (e.g. segments) disclosed herein may be retractable and extendable in any appropriate way. For example, the telescoping segments of the rear axle, down tubes, seat elevation assembly, or seat support member may include any number or telescoping pieces or segments that translate over or within another segment to retract the respective telescoping structure. For example, a central segment may translate in and out of two longitudinally opposite receiving structures (e.g. central segment 149 of FIG. 11 translates in and out of opposing receiving ends 150 of the rear axle 202). It is also to be understood that any appropriate locking mechanism may be employed to lock the various assemblies in collapsed or expanded configurations, such as latches, spring biased push-pins or screws. For example, a pin may be selectively engaged in a hole of one of the segments, allowing a user to collapse or select a comfortable riding configuration of any of the disclosed telescoping features. For example, FIG. 4 shows the seat elevation assembly 138 including various holes 158 that may receive pins of a telescoping segment 152 for adjusting a height of the seat elevation assembly. Such holes are also seen in FIG. 1 disposed on the down tubes 132 to allow the down tubes to each longitudinally retract. In some embodiments, one or more of the herein disclosed telescoping structures may be non-telescoping and fixed (e.g. FIG. 15 shows a non-telescoping rear axle 202). For example, in some embodiments the cycle may be non-foldable.

Referring to FIGS. 1 and 6, the seat elevation assembly 138 may be pivotable about the rear axle 202 and collapsible or rotatable toward the front assembly 104 of the cycle 100. The seat elevation assembly 138 may be rotatably attached to any appropriate structure of the rear assembly 106, or even may be rotatably attached to the down tubes 138 (see FIG. 10). The user may push the converging end 106 of the seat elevation assembly 138 toward the front assembly 104, causing the seat elevation assembly 138 to fold about its rotational attachment at the rear assembly 106, forwards and towards the front assembly 104 of the cycle 100. Further, the seat elevation assembly 138 may include two long rigid structures 162 that rotatably attach to one another at a top end 160 of the seat elevation assembly. The two long structures 162 may each rotatably attach to the rear assembly 106 (e.g. at rear axle 202) as shown in FIG. 3 such that when the rear axle 202 collapses, an angle between the two long structures 162 reduces, laterally contracting the seat elevation assembly 138. Likewise when the rear axle 202 expands, an angle between the long structures 162 increases, laterally expanding the seat elevation assembly 138.

In conclusion, the present invention provides a collapsible recumbent cycle 100 that can be easily collapsed longitudinally and laterally for compact storage and transport of the cycle 100. For laterally collapsing the cycle 100, the rear wheels 136 can be pushed inwardly towards each other causing the rear axle 202 to retract and the down tube assembly 132 to laterally converge. Further, to longitudinally compact the cycle 100, the rear wheels 136 may be pushed towards the front wheel 114, causing the down tube assembly 132 to longitudinally displace toward or over the front assembly 104 or alternatively longitudinally compact via telescoping segments of the down tubes 132. In some embodiments, as shown in FIGS. 7 and 8, the down tube assembly 132 while telescopically collapsed may be pushed to slide over the front wheel 114, becoming concurrently longitudinally compacted (e.g. via telescoping segments) and displaced forward over the front wheel 114. Also, the seat elevation assembly 138 may compact laterally and rotate forward toward the front end 100 of the cycle 100 (e.g. to cause the end 160 to rest on front assembly 104). The handle bars 108 collapse downward toward the front wheel 114. As such, the cycle 100 can be easily compacted longitudinally or laterally for easy stowage and transportation.

Figure 1B:
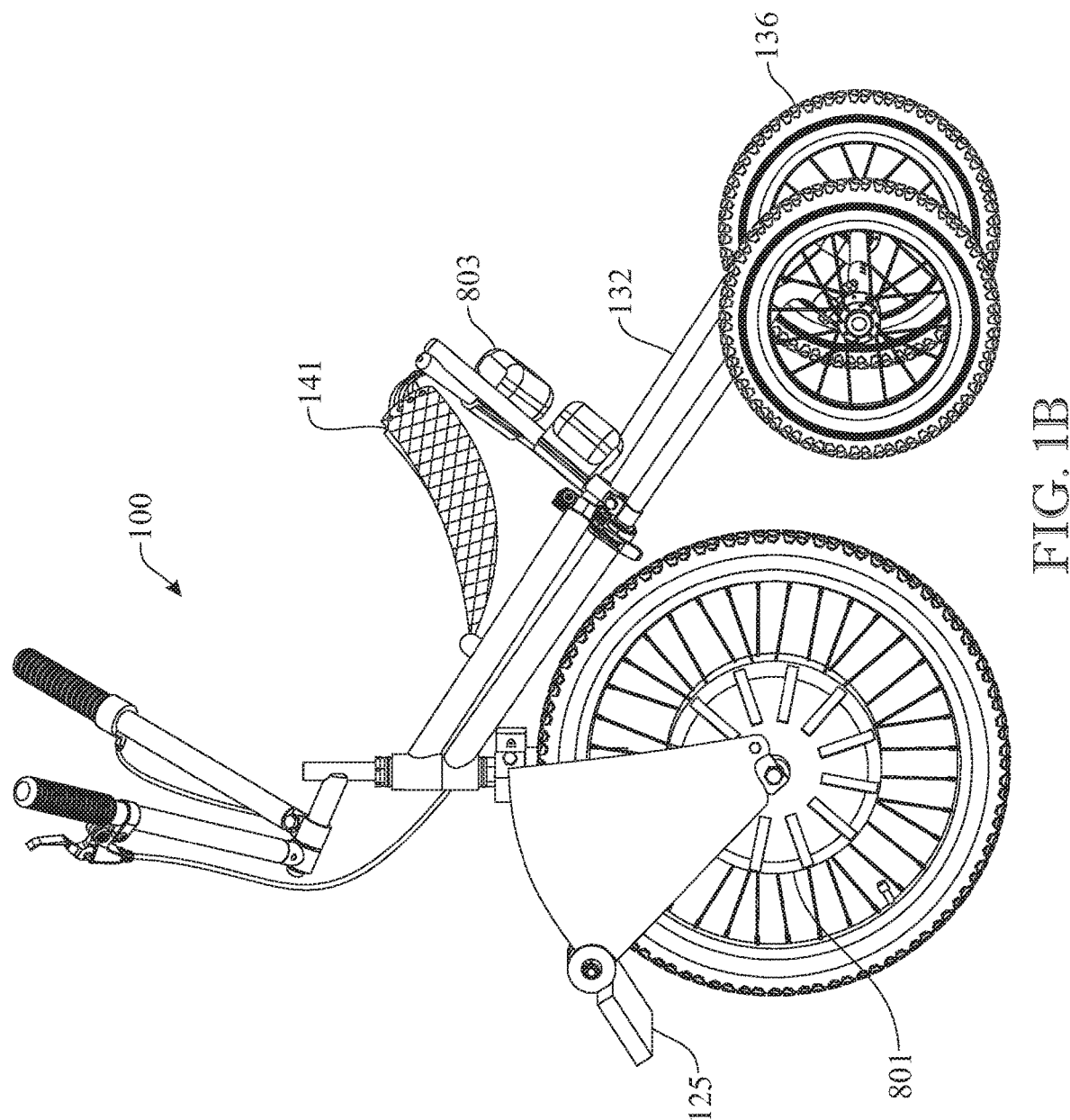
FIG. 1B shows a side view of a second alternate embodiment of the collapsible cycle in an expanded configuration

The configuration of the disclosed collapsible cycle 100 allows a user to conveniently fold the unit for transportation. For example, a user may rent such a collapsible cycle at the beach to cruise around, and may fold the cycle when necessary, such as when the user desires transporting the cycle toward the backshore or foreshore. It is to be understood that a solid seat 141 as shown in FIG. 1B may be included instead of the above described hammock-style suspended cloth. Solid seat 141 is mounted on one of the downtubes 132. As shown in FIG. 1B one or more batteries 803 can be attached behind solid seat 141. Further, the proposed configurations above provide a seat that is elevated higher than a typical recumbent cycle, giving the user a higher vantage point and a clearer view of a surrounding area (which is a typical advantage of a regular, non-recumbent bicycle), in combination providing the stability of a three-wheel unit. For example, those who do not know how to ride a bicycle may benefit from riding the herein disclosed tricycle.

Figure 16:
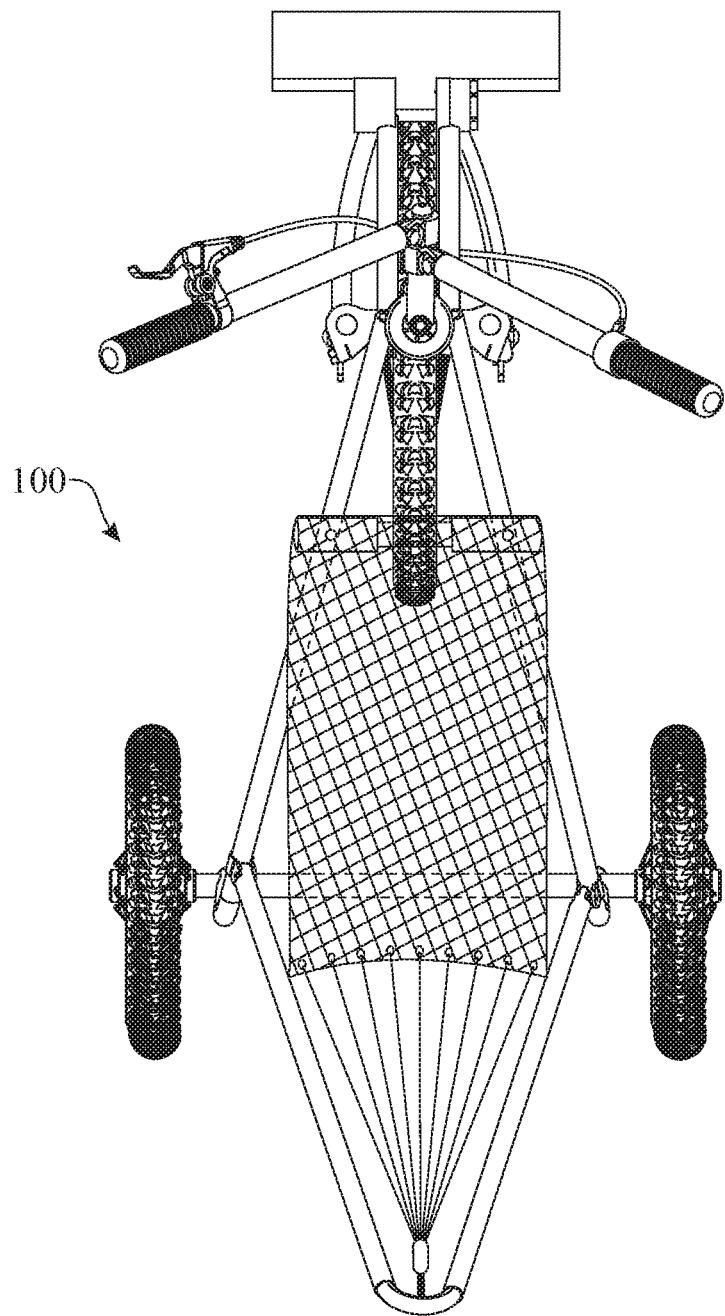
FIG. 16 schematically shows a non-folding non-collapsing frame.

In an alternative design of the cycle 100, see FIG. 16, there is a use for a casual renter that wants to show up to the beach and rent a tricycle 100 for the day to cruise around. In such instances it would not be necessary to fold the unit for transportation, extremely high usage would require to simplify the construction and make it more durable, looking from a perspective of "less moving parts, less potential failures." See FIG. 16, where the frame would be non-folding. The solid configuration can also utilize a solid seat vs. hammock style suspended cloth style.

Additionally, another benefit to the user is they are positioned higher off the ground then typical recumbent bicycle/tricycle, this gives the user a higher vantage point and more clear view of the surrounding area which is typical advantage of a regular bicycle, with a stability of a 3 wheel unit.

We claim:

1. A cycle comprising:
a fork;
a first wheel mounted to said fork;
a steerer tube connected to said fork, said steerer tube having a longitudinal axis;
a first bushing rotatably disposed on said steerer tube for rotation about said longitudinal axis;
a second bushing rotatably disposed on said steerer tube for rotation about said longitudinal axis independent of said first bushing;
a pair of second wheels;
a first downtube being mounted to said first bushing for rotation about said steerer tube together with said first bushing;
a second downtube being mounted to said second bushing for rotation about said steerer tube together with said second bushing;
said first and second downtubes each having a fixed inclination with respect to said longitudinal axis, each of said first and second downtubes respectively connecting one wheel of said pair of second wheels to said steerer tube for pivoting said pair of second wheels together and apart.

2. The cycle according to claim 1, further comprising an adjustable transverse support mounted between said first and second downtubes.

3. The cycle according to claim 2, wherein said support is mounted on said first and second downtubes adjacent said pair of second wheels.

4. The cycle according to claim 2, wherein the transverse support is an axle that carries said pair of second wheels.

5. The cycle according to claim 1, further comprising,
seat support tubes pivotably connected to one another at a first end and each of said seat support tubes connected at a respective downtube of said first and second downtubes at a second end opposite the first end;
a hammock seat mounted between said seat support tubes and said first and second down tubes.

6. The cycle according to claim 1, wherein said first and second bushings are concentric with said steerer tube.

7. A cycle comprising:
a fork;
a first wheel mounted to said fork;
a steerer tube connected to said fork, said steerer tube having a longitudinal axis;
a pair of second wheels;
a pair of downtubes rotationally mounted to said steerer tube about said longitudinal axis by respective sleeves, said pair of downtubes each being longitudinally displaceable through said respective sleeves for compacting the cycle in a longitudinal direction thereof, each one of said down tubes respectively connecting one wheel of said pair of second wheels to said steerer tube for pivoting said pair of second wheels together and apart, each of said respective sleeves being mounted on respective bushings, said respective bushings being consecutively disposed on said steerer tube.

8. The cycle according to claim 7, wherein said pair of downtubes have a curved extent corresponding to said first wheel radius.

9. A cycle comprising:
a fork;
a first wheel mounted to said fork;
a steerer tube connected to said fork, said steerer tube having a longitudinal axis;
a pair of second wheels;
a pair of downtubes rotationally mounted to said steerer tube about said longitudinal axis, said pair of downtubes each having a fixed inclination with respect to said longitudinal axis, each one of said pair of downtubes respectively connecting one wheel of said pair of second wheels to said steerer tube for pivoting said pair of second wheels together and apart;
seat support tubes connected to one another at a first end thereof and each of said seat support tubes connected at a respective downtube of said pair of downtubes at a second end opposite the first end;
a hammock seat mounted between said seat support tubes and said pair of down tubes.

* * * * *